United States Patent
Hvidsten et al.

(10) Patent No.: US 11,005,521 B2
(45) Date of Patent: May 11, 2021

(54) EFFICIENT HANDLING OF CLOCK OFFSET IN SPREAD SPECTRUM DECODERS

(71) Applicant: Cisco Technology, Inc., San Jose, CA (US)

(72) Inventors: Knut Inge Hvidsten, Oslo (NO); Michael A. Ramalho, Lakewood Ranch, FL (US); Ragnvald Balch Barth, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/779,880

(22) Filed: Feb. 3, 2020

(65) Prior Publication Data

US 2020/0169289 A1 May 28, 2020

Related U.S. Application Data

(63) Continuation of application No. 16/179,234, filed on Nov. 2, 2018, now Pat. No. 10,601,459.

(51) Int. Cl.
*H04B 1/7095* (2011.01)
*H04L 7/00* (2006.01)
*H04B 1/708* (2011.01)

(52) U.S. Cl.
CPC ........... *H04B 1/7095* (2013.01); *H04B 1/708* (2013.01); *H04L 7/0025* (2013.01); *H04B 2201/7073* (2013.01)

(58) Field of Classification Search
CPC ......... G01L 19/00; G01L 19/16; G06F 17/14; G06F 17/15; G06F 17/142; G06F 17/147;
(Continued)

(56) References Cited

U.S. PATENT DOCUMENTS 5,142,656 A  8/1992 Fielder et al.
5,184,316 A  2/1993 Sugiyama
(Continued)

FOREIGN PATENT DOCUMENTS

CN  104753561 A  7/2015

OTHER PUBLICATIONS

H. Delic, "The Prometheus Orthonormal Set for Wideband CDMA", IEEE Melecon 2004, May 12-15, 2004, Dubrovnik, Croatia, 4 pages.
(Continued)

*Primary Examiner* — Shawkat M Ali
(74) *Attorney, Agent, or Firm* — Edell, Shapiro & Finnan, LLC

(57) ABSTRACT

Doppler correlators are configured to receive samples of a signal sampled based on a frequency. Each Doppler correlator includes successive butterfly elements. Each butterfly element includes cross-coupled first and second branches that include a sample delay that doubles for each successive butterfly element, and a sample inversion selectively placed in one of the first and second branches to encode into the successive butterfly elements of each Doppler correlator the same code sequence. Each Doppler correlator is configured with a respective phase rotation that varies across the Doppler correlators. Each Doppler correlator is configured to correlate the samples against the code sequence and apply the respective phase rotation to the samples as the samples are shifted through the successive butterfly elements, to produce respective correlation results from each Doppler correlator centered on a respective frequency offset from the frequency that varies across the Doppler correlators based on the phase rotations.

20 Claims, 17 Drawing Sheets

(58) Field of Classification Search
CPC . H04B 1/00; H04B 1/69; H04B 1/185; H04B 1/707; H04B 1/708; H04B 1/7095; H04B 7/216; H04J 3/06; H04J 13/04; H04L 7/0025; H04L 27/20; H04L 27/30
USPC ........ 370/342, 350; 375/140, 142, 148, 150, 375/219, 295, 308, 316, 343, 346; 708/203, 404, 425
See application file for complete search history.

(56) References Cited

U.S. PATENT DOCUMENTS

| | | | |
|---|---|---|---|
| 5,301,255 | A | 4/1994 | Nagai et al. |
| 5,349,549 | A | 9/1994 | Tsutsui |
| 5,357,594 | A | 10/1994 | Fielder |
| 5,363,096 | A | 11/1994 | Duhamel et al. |
| 5,394,473 | A | 2/1995 | Davidson |
| 5,471,558 | A | 11/1995 | Tsutsui |
| 5,479,562 | A | 12/1995 | Fielder et al. |
| 5,506,623 | A | 4/1996 | Sako et al. |
| 5,619,197 | A | 4/1997 | Nakamura |
| 5,636,324 | A | 6/1997 | Teh et al. |
| 5,913,186 | A | 6/1999 | Byrnes et al. |
| 6,141,337 | A | 10/2000 | Uta et al. |
| 6,952,440 | B1 | 10/2005 | Underbrink |
| 7,039,036 | B1 | 5/2006 | Dabak et al. |
| 7,852,318 | B2 | 12/2010 | Altman |
| 8,212,854 | B2 | 7/2012 | Marton et al. |
| 8,259,603 | B2 | 9/2012 | Kuroda et al. |
| 8,275,820 | B2 | 9/2012 | Jhang et al. |
| 8,503,485 | B2 | 8/2013 | Malladi et al. |
| 10,003,377 | B1 | 6/2018 | Ramalho et al. |
| 10,601,459 | B1 * | 3/2020 | Hvidsten ............... H04L 7/0025 |
| 2002/0181626 | A1 * | 12/2002 | Sung ..................... H04B 1/707 375/347 |
| 2003/0043775 | A1 | 3/2003 | Kikuchi |
| 2004/0071195 | A1 | 4/2004 | Huang et al. |
| 2009/0135800 | A1 | 5/2009 | McPherson |
| 2010/0310009 | A1 | 12/2010 | Lakkis |
| 2011/0007783 | A1 | 1/2011 | Weill |
| 2018/0175903 | A1 | 6/2018 | Ramalho et al. |

OTHER PUBLICATIONS

W. Ouyang, "Fast Algorithm for Walsh Hadamard Transform on Sliding Windows", IEEE Transactions on Pattern Analysis and Machine Intelligence, vol. 32, Issue 1, Jan. 2010, 16 pages.

Eric Jacobsen, "Understanding and Implementing the Sliding DFT", Anchor Hill Communications, www.anchorhill.com, Apr. 2015, 5 pages.

M. An, et al., "Pons, Reed-Muller Codes, and Group Algebras", Computational noncommutative Algebra and Applications, pp. 155-196, part of the NATO Science Series II: Mathematics, Physics and Chemistry book series, NAII, vol. 136), 2004, 42 pages.

A. la Cour-Harbo, "On the Rudin-Shapiro transformation", ScienceDirect, Appl. Comput. Harmon. Anal. 24 (2008) 310-328, www. sciencedirect.com, 19 pages.

T. Yoshioka, et al., "Making Machines Understand Us in Reverberant Rooms", [Robustness against reverberation for automatic speech recognition], Fundamental Technologies in Modern Speech Recognition, IEEE Signal Processing Magazine, Nov. 2012, 13 pages.

K.K. Wong, et al., "Spread Spectrum Techniques for Indoor Wireless IR Communications", Optical Wireless Communications, IEEE Wireless Communications, Apr. 2003, 11 pages.

Aubry, Augusto et al., "Optimizing Radar Waveform and Doppler Filter Bank via Generalized Fractional Programming", IEEE Journal of Selected Topics in Signal Processing, vol. 9, No. 8, Dec. 2015, 13 pages.

* cited by examiner

| N | CONCATENATION | PONS MATRIX | ROW NAMES |
|---|---|---|---|
| R1: 2 | | + + / - - | $A_2$ / $B_2$ |
| R2: 4 | $A_2$ $B_2$ / $A_2$ $-B_2$ / $B_2$ $A_2$ / $-B_2$ $A_2$ | + + + − / + + − + / + − + + / − + + + | $A_4$ / $B_4$ / $C_4$ / $D_4$ |
| R3: 8 | $A_4$ $B_4$ / $A_4$ $-B_4$ / $B_4$ $A_4$ / $-B_4$ $A_4$ / $C_4$ $D_4$ / $C_4$ $-D_4$ / $D_4$ $C_4$ / $-D_4$ $C_4$ | (8×8 ± matrix) | $A_8$ / $B_8$ / $C_8$ / $D_8$ / $E_8$ / $F_8$ / $G_8$ / $H_8$ |

FIG.1B

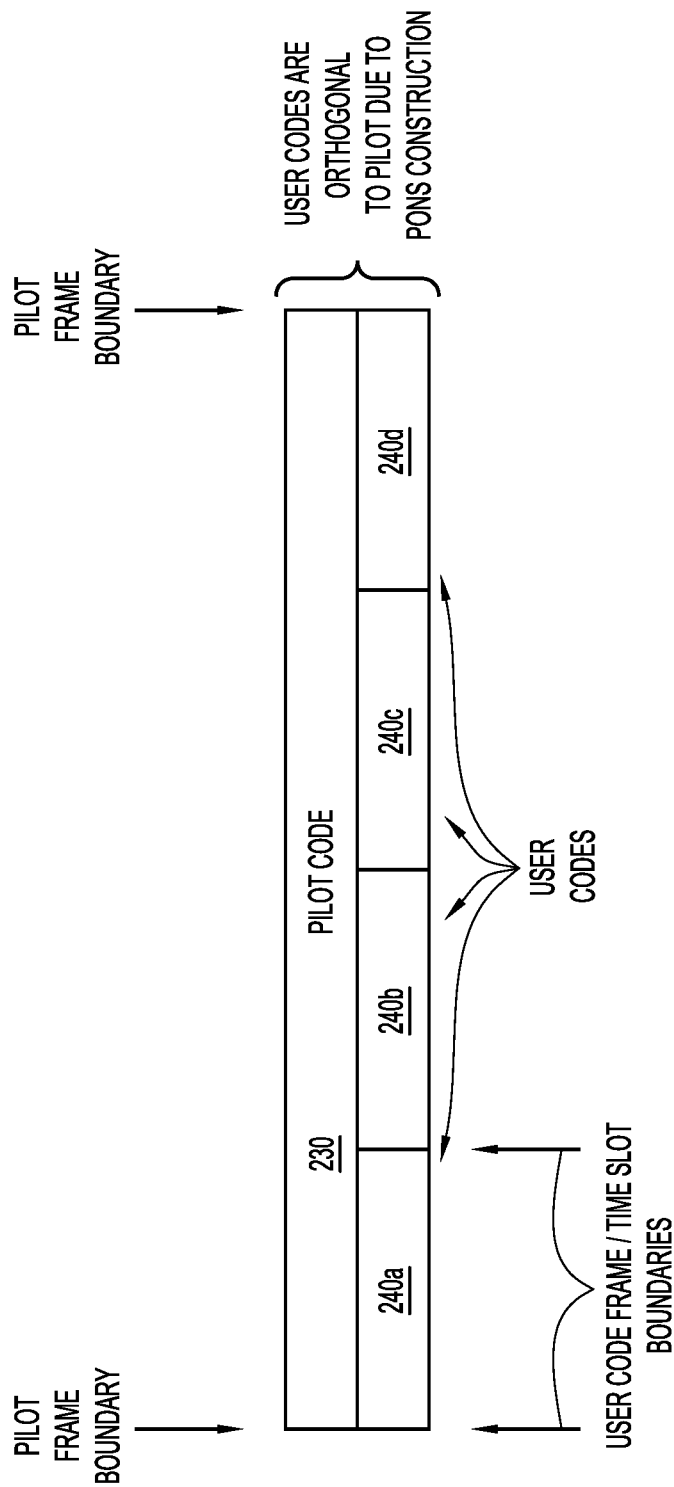

EFFICIENT HANDLING OF CLOCK OFFSET IN SPREAD SPECTRUM DECODERS

CROSS-REFERENCE TO RELATED APPLICATIONS

This application is a continuation of U.S. patent application Ser. No. 16/179,234, filed Nov. 2, 2018, the entirety of which is incorporated herein by reference.

TECHNICAL FIELD

The present disclosure relates generally to correlation in a spread spectrum receiver to compensate for a time offset or frequency error between the receiver and a spread spectrum transmitter.

BACKGROUND

A spread spectrum receiver correlates a receive signal against a known code sequence to find a time lag corresponding to a time delay between the spread spectrum receiver and a spread spectrum transmitter. The spread spectrum receiver decodes the receive signal based on the time lag. The correlation represents a significant computational burden for a correlator processor in the receiver. Clock offset/frequency error between the spread spectrum transmitter and the spread spectrum receiver can degrade correlation results in the spread spectrum receiver, which can correspondingly degrade the ability of the receiver to decode the receive signal.

BRIEF DESCRIPTION OF THE DRAWINGS

FIG. 1B is an illustration of a method of constructing a code sequence based on a Prometheus Orthonormal Set (PONS), according to an example embodiment.

FIG. 2B is an illustration of a timing relationship between a pilot code and user codes generated by the spread spectrum acoustic transmitter, according to an embodiment.

DESCRIPTION OF EXAMPLE EMBODIMENTS

Overview

In one embodiment, an apparatus is provided that includes a Doppler correlator bank including Doppler correlators. Each Doppler correlator is configured to receive samples of a signal sampled based on a frequency. Each Doppler correlator respectively includes successive butterfly elements. Each butterfly element includes cross-coupled first and second branches that include a sample delay that doubles for each successive butterfly element, and a sample inversion selectively placed in one of the first and second branches to encode into the successive butterfly elements of each Doppler correlator the same code sequence. Each Doppler correlator is configured with a respective phase rotation that varies across the Doppler correlators. Each Doppler correlator is configured to correlate the samples against the code sequence and apply the respective phase rotation to the samples as the samples are shifted through the successive butterfly elements, to produce respective correlation results from each Doppler correlator centered on a respective frequency offset from the frequency that varies across the Doppler correlators based on the phase rotations.

EXAMPLE EMBODIMENTS

Figure 1A:
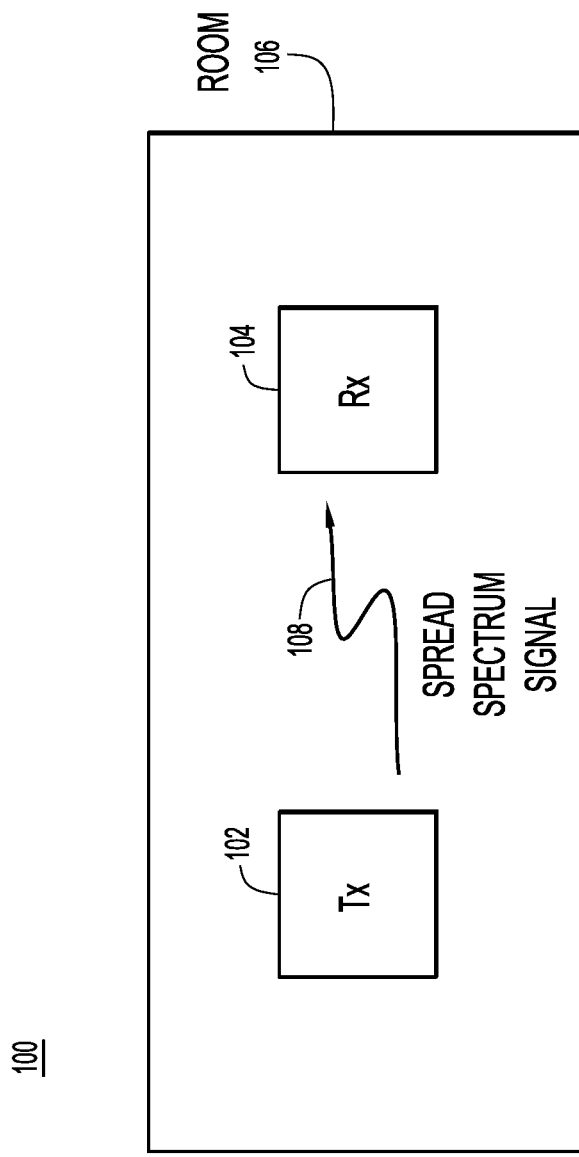
FIG. 1A is a block diagram of a spread spectrum communication system including a spread spectrum transmitter (TX) and a spread spectrum receiver (RX), according to an example embodiment.

With reference to FIG. 1A, there is a block diagram of an acoustic spread spectrum communication system 100 including a spread spectrum transmitter (TX) 102 and spread spectrum receiver (RX) 104 deployed in a room 106. Transmitter 102 generates and transmits into room 106 a spread spectrum acoustic signal or sequence 108 including a pilot code and a set of one or more user codes (e.g., 1, 4, 8, or any other integer number of user codes) that is time-synchronized to the pilot code. In an embodiment, transmitter 102 use code sequences for the pilot code and the user codes that are based on a Prometheus Orthonormal Set (PONS), i.e., a PONS construction, described below. Receiver 104 receives spread spectrum acoustic signal 108, synchronizes receiver timing to the pilot code in the received signal, and recovers/decodes the one or more user codes from the received signal based on the receiver timing. That is, receiver 104 decodes the one or more user codes from the received signal based on the pilot code At a high-level, to synchronize receiver timing to the pilot code, receiver 104 correlates the received signal against a replica of the pilot code, to produce correlation results. Receiver 104 then identifies a correlation peak in the correlation results, and establishes receiver timing based on the identified correlation peak. Clock offset/frequency error between transmitter 102 and receiver 104 can degrade correlation performance. Embodiments presented below in connection with FIGS. 10-13, primarily, provide computationally efficient correlators that compensate for clock offset/frequency error, to improve recovery of receiver timing in the presence of the clock offset/frequency error, and thus improve decoding of user codes from the received signal.

With reference to FIG. 1B, there is an illustration of a method 150 of constructing a code sequence (i.e., a code) based on the PONS construction. The PONS construction uses repetitive concatenation of relatively smaller PONS matrices to construct relatively larger PONS matrices. Each PONS matrix is a square matrix having an equal number of rows and columns. Each row represents a PONS code (also referred to simply as "PONS"). The PONS code includes a unique pattern of negative binary values "−" and positive binary values "+" having a dimension or width of N binary values. The method of FIG. 1B is an example of an N=8 PONS construction.

The method of FIG. 1B is illustrated as a table having table rows R1, R2, and R3 for successive PONS codes of increasing sizes N=2, N=4, and N=8. The table includes table columns C1, C2, and C3 to indicate a PONS dimension N for the PONS matrix for each table row, show which PONS rows of a smaller, previous PONS matrix are concatenated to construct the PONS matrix for each table row, and indicate labels identifying the PONS rows in the PONS matrix, respectively. The table shows construction of an 8×8 PONS matrix (i.e., an N=8 PONS matrix, shown in table row R3) from a 2×2 PONS matrix, with PONS rows $A_2$ and $B_2$ (i.e., an N=2 PONS matrix shown in table row R1). The construction includes concatenation and selective inversion of the two PONS rows $A_2$ and $B_2$ to form a 4×4 PONS matrix with PONS rows $A_4$, $B_4$, $C_4$ and $D_4$ (shown in table row R2). The four PONS rows are (again) concatenated and selectively inverted to form the 8×8 PONS matrix shown in table row 3. The aforementioned procedure may be applied repeatedly to create ever larger power-of-two PONS matrices. In the example of FIG. 1B, each PONS matrix is symmetric, and is referred to as a symmetric PONS (sPONS) matrix. Embodiments presented below use sPONS matrices by way of example, only; however, methods can be adopted in a straight-forward manner for the non-symmetric PONS case.

Figure 2A:
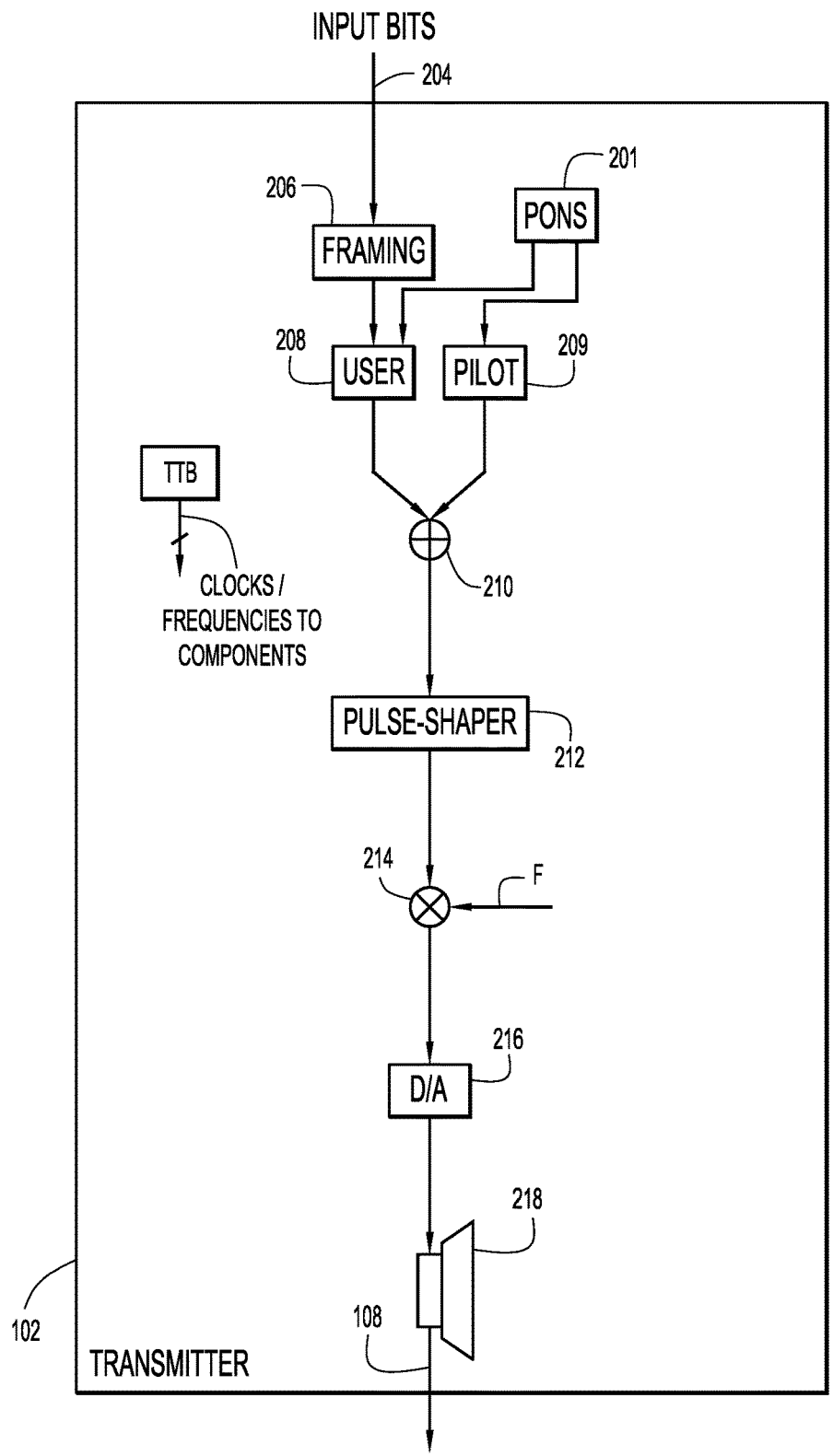
FIG. 2A is a block diagram of a spread spectrum acoustic transmitter in which pilot codes and user codes based on Prometheus Orthonormal Set (PONS) codes may be used, according to an example embodiment.

With reference to FIG. 2A, there is a block diagram of transmitter 102 according to an embodiment. Transmitter 102 includes a code memory 201 to store a set of predetermined PONS codes used by the transmitter to generate spread spectrum acoustic signal 108. Transmitter 200 receives a stream or sequence of digital bits 204. A framer 206 frames the bits into groups/frames of bits, and a user encoder 208 encodes the groups of bits into symbols represented as user codes selected from the set of predetermined PONS codes. A pilot generator 209 generates a pilot code as a sequence of PONS codes also selected from memory 201. For example, generator 209 may concatenate multiple PONS codes from memory 201 into the pilot code. An adder 210 combines and time-synchronizes the user codes with the pilot code to produce a combined, digitized baseband signal. A pulse-shaper/up-sampler 212 employs a root-raised cosine (RRC) filter to generate a digital baseband signal. An upconverter 214 frequency-upconverts the combined, digitized baseband signal based on a local oscillator frequency F, to produce a digitized, upconverted signal. A "real( )" operation discards imaginary components of the digitized, upconverted signal, leaving only real components of the signal. A digital-to-analog (D/A) 216 converts the digitized, upconverted signal to an analog upconverted signal, and an amplifier and loudspeaker 218 converts the aforementioned signal to acoustic signal 108 (i.e., the spread spectrum signal) and transmits the acoustic signal. Acoustic signal 108 includes one or more user codes synchronized to the pilot code. Acoustic signal 108 may have a frequency spectrum in an audible frequency band of human hearing (e.g., up to 20 kHz), an ultrasound frequency band (e.g., above 20 kHz), or a frequency band that spans both the audible and the ultrasound frequency bands.

Transmitter 102 also includes a transmitter timebase TTB to generate one or more frequencies/clocks from a local base clock/reference frequency. The various transmitter components 206-216 mentioned above generate their various output signals using the one or more frequencies/clocks generated by the TTB.

FIG. 2B is an illustration of an example timing relationship between a pilot code 230 represented as a sequence of 4 contiguous PONS codes, and a sequence of 4 contiguous user codes 240a, 240b, 240c, and 240d as would exist in baseband signals of transmitter 102 and correspondingly in acoustic signal 108. Pilot code 230 spans a pilot frame and each of user codes 240i spans/occupies a respective user code frame or time slot in acoustic signal 108. With the illustrated timing relationship in which the full extent of user codes 240a-240d begins and ends in time alignment with pilot code 230, and due to the properties of the PONS construction, each user code 240i is orthogonal to the portion of the pilot code of the same length. More generally, transmitter 102 transmits each pilot code to span a set of M user codes, where M may be any power-of-two integer, such as 2, 4, 8, 16, and so on, in which case the set of M user codes are said to belong to the transmitted pilot code.

Figure 3:
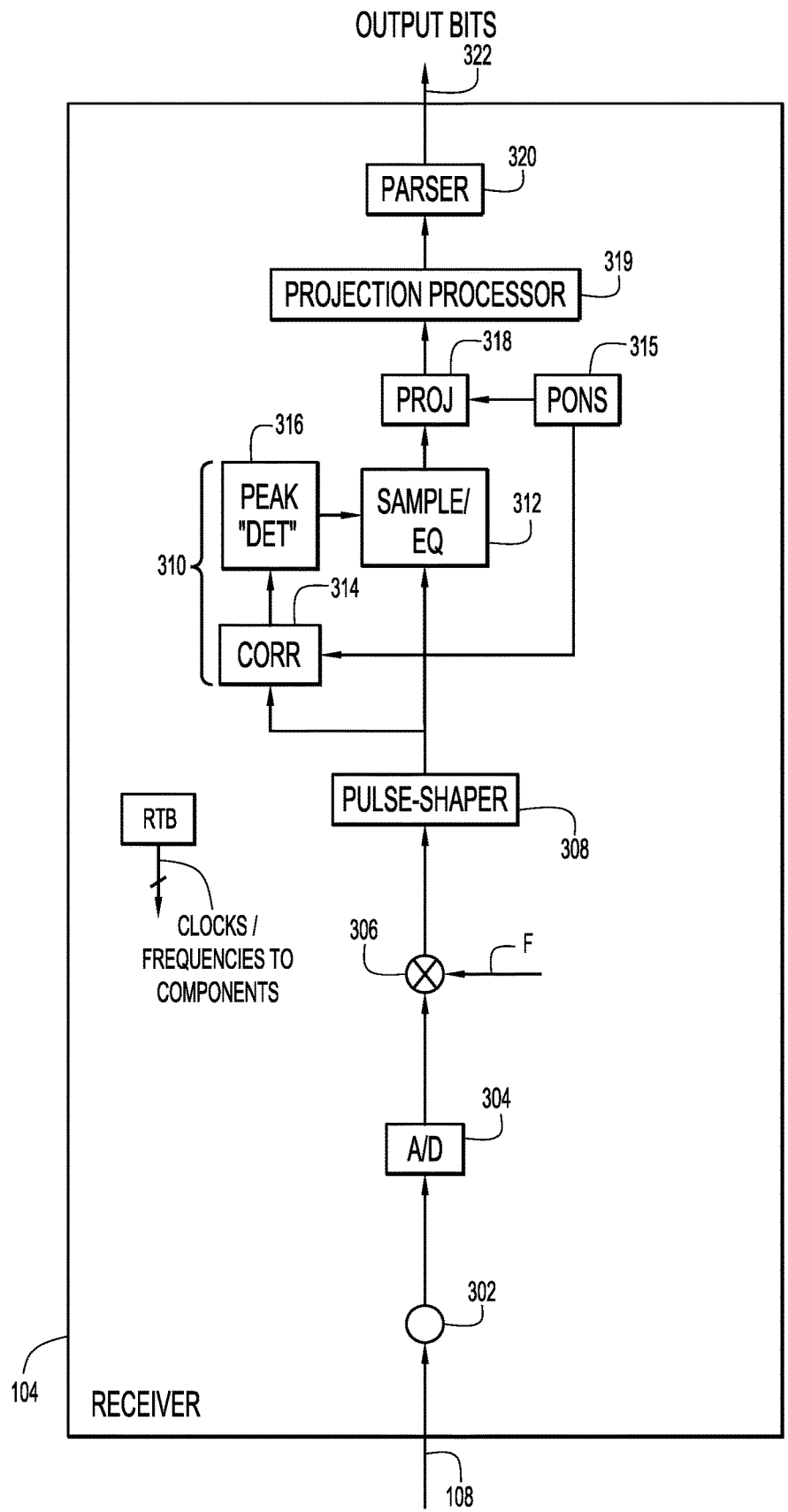
FIG. 3 is a block diagram of a spread spectrum acoustic receiver that receives and processes a spread spectrum acoustic signal using a correlator to recover user codes, according to an example embodiment.

With reference to FIG. 3, there is a block diagram of receiver 104 that processes transmitted acoustic signal 108 to recover the bits from the symbols in the acoustic signal, according to an embodiment. Receiver 104 includes a receiver timebase RTB to generate one or more frequencies/clocks from a local base clock/reference frequency. The various receiver components 304-320 described below generate their various output signals using the one or more frequencies/clocks generated from the base clock frequency. As will be described more fully below in connection with FIGS. 10-13, embodiments presented herein compensate for clock offset/frequency error between the reference frequency of the receiver timebase RTB and the reference frequency of transmitter timebase TTB mentioned above in connection with FIG. 1A.

Receiver 104 includes a microphone assembly 302 to detect acoustic signal 108, an analog-to-digital (A/D) converter 304 to digitize the detected acoustic signal, and a down-converter 306 to frequency down-convert the digitized, detected acoustic signal based on a local oscillator frequency F, to produce a digitized baseband signal. A pulse shaper 308 filters the digitized baseband signal to produce a filtered version of the digitized baseband signal and provides samples thereof to a correlator assembly 310 and a sampler/equalizer 312.

Correlator assembly 310 detects the pilot code in the digitized baseband signal to establish timing synchronization with the digitized baseband signal, which enables receiver 104 to demodulate the user codes in the digitized baseband signal. Correlator assembly 310 includes a correlator 314 ("Corr") a peak detector 316 following the correlator. Different embodiments for correlator 314 are described below. Generally, correlator 314 receives, from a code memory 315 that stores the same set of predetermined PONS codes as transmitter code memory 201, a replica code that matches (i.e., is a replica of) the pilot code. Correlator 314 correlates sequential samples of the digitized baseband signal against the replica code to produce sequential correlation results, i.e., correlation amplitudes. Peak detector 316 detects peaks (i.e., cross-correlation peaks) and their timing in the correlation results as time progress. The timing of the peaks represents a synchronization point to be used by receiver 104 to demodulate the user codes from their respective time slots. That is, receiver 104 uses the peak magnitude timing for user code timing recovery, and then demodulation/recovery of the user codes.

Sampler/equalizer 312 selects a subset of samples corresponding to one group/frame of samples and performs a complex phase rotation according to a peak magnitude and associated complex phase angle provided by correlator assembly 310, to produce baseband spread spectrum chips (i.e., user code energy) spanning the time slot for and representative of each user code. For each user code time slot, a projector 318 projects each PONS code from the set of predetermined PONS codes onto the user code energy in the time slot (e.g., using a dot product/inner product function that applies PONS code samples against chip samples in the time slot), to produce a respective/individual user code projection corresponding to each predetermined PONS code. Collectively, the user code projections represent, for the given user code time slot, a vector of user code projections (also referred to as a "projection vector" or a "column vector") having user code projections as row elements. The row indexes of the user code projections map to/indicate correspond ones of the PONS codes. Projector 318 provides the projection vector for each user code time slot to projection processor 319. Projection processor 319 recovers the user code transmitted by transmitter 102 from the projection vectors. Receiver 104 maps the recovered user codes to a stream of groups of bits. Parser 320 de-frames the bit stream to recover output bits 322 representative of input bits 204.

Transmitter 102 and receiver 104 are described above as transmitting, receiving, and processing acoustic signals by way of example, only. It is understood that embodiments presented herein may be used with transmitters and receivers that transmit, receive, and process at any frequency, signals that include acoustic waves propagated through any media, including air or other media, such as water, electromagnetic waves (e.g., radio), and signals stored or encoded on physical storage media, including memory magnetic hard drives and so. Moreover, the embodiments presented herein apply equally well to non-acoustic spread spectrum signals.

In accordance with embodiments described below, PONS correlator 314 is configured to implement fast (e.g., $\log_2(N)$) correlation, e.g., cross-correlation, with reduced computational complexity compared to conventional correlations that employ multiply and add (accumulate) operations to correlate each of a sequence of input samples with each of a sequence or pattern of code samples. The embodiments encode into a structure of PONS correlator 314 a predetermined row of a PONS matrix to enable the correlator to correlate the input samples against the row of the PONS matrix in a computationally efficient manner.

Further embodiments of PONS correlator 314 described below in connection with FIGS. 10-13, specifically, provide Doppler correlators and Doppler correlator banks, which add phase rotation to the efficient PONS correlator, to compensate for/match clock offset/frequency error that may exist between the reference frequency of the receiver timebase RTB mentioned above in connection with FIG. 3 and the reference frequency of transmitter timebase TTB mentioned above in connection with FIG. 1A, or introduced as a result of Doppler motion of the receiver with respect to the transmitter.

Accordingly, in the ensuing description, embodiments of PONS correlator 314 without phase rotation are first described in connection FIGS. 4-9. Then, embodiments of PONS correlator 314 with phase rotation (including the Doppler correlator banks) to compensate for clock offset/frequency error, are described in connection with FIGS. 10-13.

PONS Correlator—No Phase Rotation

Figure 4:
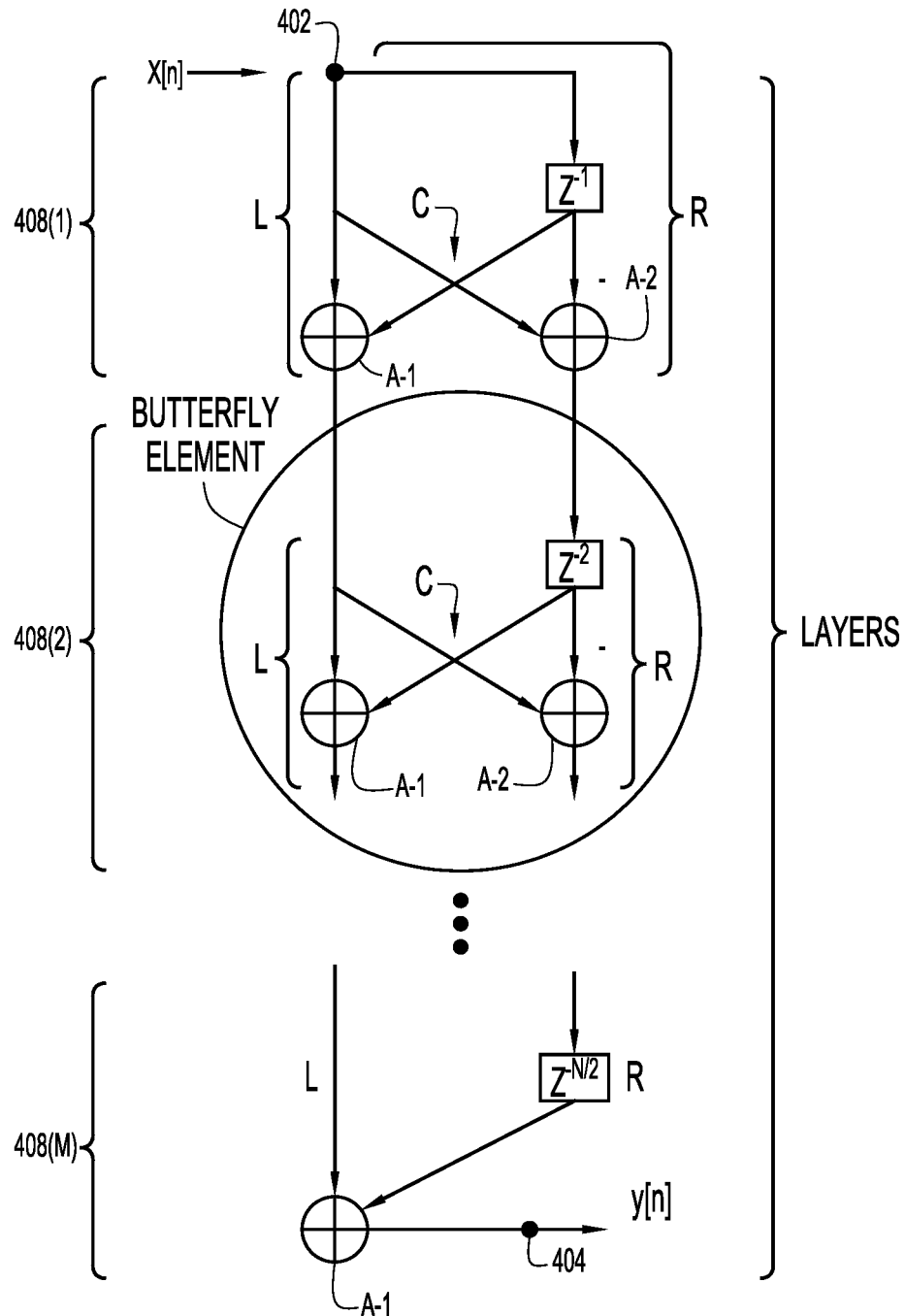
FIG. 4 is an illustration of a generalized structure of the PONS correlator, according to an example embodiment.

With reference to FIG. 4, there is an illustration of a generalized structure 400 of PONS correlator 314 (also referred to as "PONS correlator 400") that can be used to correlate an input x[n] against any particular row of a PONS matrix of any power of two size N, to produce correlation results y[n], according to an embodiment. Generalized structure 400 does not impose phase rotation on input x[n]. The function elements/components depicted in structure 400 also represent a method of correlating input x[n] against the particular row using the structure, to produce correlation results y[n].

Structure 400 includes an input node 402 to receive a sequence of input samples x[n], an output node 404 to produce correlation results y[n], and successive layers of butterfly elements 408(1)-408(M) (collectively referred to as "butterfly elements 408") each connected one to the next between the input node and the output node. Each butterfly element 408(i) represents a computational element for processing samples, as described below. Specifically, input node 404 is connected to an input of butterfly element 408(1) (the first butterfly element) and an output of butterfly element 408(M) (the last butterfly element) is connected to output node 404. In the embodiment of FIG. 4, each layer of PONS correlator 400 (i.e., structure 400) includes a single butterfly element 408(i).

At a high-level, each butterfly element 408(i) (e.g., butterfly element 408(2)) respectively includes a left branch L (also referred to as a "first branch L") and a right branch R (also referred to as a "second branch R") that are cross-coupled with each other as indicated at C in FIG. 4 and that are configured to perform, collectively, sample add operations (indicated in FIG. 4 by circles encircling a "+" sign) and programmable sample delay operations (indicated in FIG. 4 by rectangles including a "z"). Generally, left branch L and right branch R receive their respective inputs from respective outputs of a previous left branch L (i.e., from a previous butterfly element) and from a previous right branch R. Also, either left branch L or right branch R of each butterfly element 408(i) is selectively configured to perform a sample inversion (each indicated in FIG. 4 by "−" sign prior to an add operation). That is, the sample inversion is mutually exclusive between the two branches of each butterfly element 408(i).

In accordance with embodiments presented herein, a unique pattern of sample inversions of the left branch L and the right branch R across all of successive butterfly elements 408 results in an encoding into the successive butterfly elements of a unique pattern of negative and positive binary values of/for a particular row of a PONS matrix, i.e., a PONS code. Thus, given that encoding, successive butterfly elements 408 are configured to correlate input samples applied to/received by input node 402 x[n] against the particular row of the PONS matrix as the input samples are shifted through the successive butterfly elements, to produce at output node 404 correlation results indicative of whether a pattern of the input samples matches the pattern of negative and positive binary values of the particular row of the PONS matrix, as encoded into the butterfly elements according to the unique pattern of sample inversions. In the example of FIG. 4, the correlation results represent a functional equivalent of regular cross-correlation results produced with substantially reduced arithmetic complexity compared to conventional/standard cross-correlation results produced in a conventional correlator structure, for example, in a correlator structure in which input samples are shifted through a register of multiple sample storage elements and, at each shift, performs a multiply operation of each sample in the register against a corresponding code value, and then adds all of the multiply results into a correlation result (thus implementing a conventional sliding window correlator). That is, the structure of FIG. 4 produces the correlation results with substantially reduced arithmetic complexity compared to the conventional correlator.

With a few exceptions noted below, each butterfly element 408(i) includes left branch L and right branch R. Left branch L and right branch R are connected to a previous left branch L and a previous right branch R (of a previous butterfly element) so that left branch L and right branch R receive their respective inputs from respective outputs of a previous left branch L and a previous right branch R, respectively. Also: left branch L includes a first adder A-1 connected between an input of the left branch and an output of the left branch; (ii) right branch R includes a programmable sample delay unit/element z (e.g., a programmable power of 2 sample delay unit) connected in series with (i.e., followed by) a second adder A-2, such that the sample delay unit (also referred to more simply as a "delay unit") and the second adder are connected in series between an input to the right branch and an output of the right branch; and (iii) cross-coupling C is configured such that an output of delay unit z feeds an input to adder A-1, and the input to left branch L feeds an input to adder A-2. The exceptions to the above configuration include: (i) in first butterfly element 408(1), both left branch L and right branch R receive input sequence x[n] as inputs; and (ii) second adder A-2 of last butterfly element 408(N) is omitted so that delay unit z feeds adder A-1 in the last butterfly element.

In FIG. 4, each sample inversion in butterfly element 408(i) is represented as a minus sign "−" applied to an input of either adder A-1 in left branch L or an input to adder A-2 in right branch R. In one example, a given adder (either A-1 or A-2) in a given butterfly element may be re-configured as a subtractor to implement the indicated sample inversion. Alternatively, a sample inverter to perform the sample inversion may be inserted in the given left branch L or right branch R prior to the given adder to implement the indicated sample inversion prior to the adder. Thus, each butterfly element 408(i) is configured in either (i) a first arrangement in which right branch R performs the sample-inversion, but left branch L does not perform the sample arrangement, or (ii) a second arrangement in which left branch L performs the sample inversion, but right branch R does not perform the sample inversion. For example, in both butterfly elements 408(1) and 402(2) respective right branches R perform sample inversions.

Operationally, when a given butterfly element 408(i) is configured in the first arrangement:
 a. Left branch L is configured to receive a first sample output by a previous left branch L (i.e., previous L), and add the first sample to a delayed sample from right branch R, to produce a first output sample to be provided as a next first sample to a next left branch (i.e., next L); and
 b. Right branch R is configured to receive a second sample output by a previous right branch R (i.e., previous R), delay the second sample to produce the delayed sample, invert the delayed sample, and add the inverted delayed sample to the first sample to produce a second output sample to be provided as a next second sample to a next right branch R (i.e., next R).

Alternatively, when the given butterfly element 408(i) is configured in the second arrangement:
 a. Left branch L is configured to receive first sample output by a previous left branch L (i.e., previous L), invert the first sample, and add the inverted first sample to a delayed sample from right branch R to produce a first output sample to be provided as a next first sample to a next left branch L (i.e., next L); and
 b. Right branch R is configured to receive a second sample output by a previous right branch R (i.e., previous R), delay the second sample to produce the delayed sample, and add the delayed sample to the first sample, to produce a second output sample to be provide as a next second sample to a next right branch R (i.e., next R).

The number of successive butterfly elements 408 of correlator 400 depends on the width N of the PONS row encoded into the PONS correlator 400. Where $N=2^x$ (x is an integer), the number of successive butterfly elements, M, is given by $M=\log_2 N$. Thus, M is less than the width N of the PONS row. Also, the programmable delay unit z implements a delay that increases by a factor of 2 for each successive butterfly element, beginning with a 1-sample delay at butterfly element 408(1). An advantage of correlator 400 is that butterfly elements 408(i) do not perform any multiplies, i.e., there are no multiplies in either branch of each butterfly element, which reduces computational complexity.

As mentioned above, the specific pattern of sample inversions programmed into the first/left and second/right branches L, R of successive butterfly elements 408(1)-402(N) encodes a width N PONS code into structure 400, against which input sample are correlated. A method of determining placement of the sample inversions (i.e., whether to program either left branch L or right branch R) in each of successive butterfly elements 408 is now described in connection with FIGS. 5-8.

$$\text{PILOT}_8 = (A_8, B_8, A_8, -B_8)$$

$$\text{USER SYMBOL}_8^i \in (\pm C_8, \pm D_8, \pm E_8, \pm F_8, \pm G_8, \pm H_8)$$

$$\text{USER SYMBOL}_8^i \notin (A_8, B_8)$$

$$\text{USER SYMBOL}_8^{1 \cdots 4} = (D_8, G_8, F_8, E_8)$$

Figure 5:
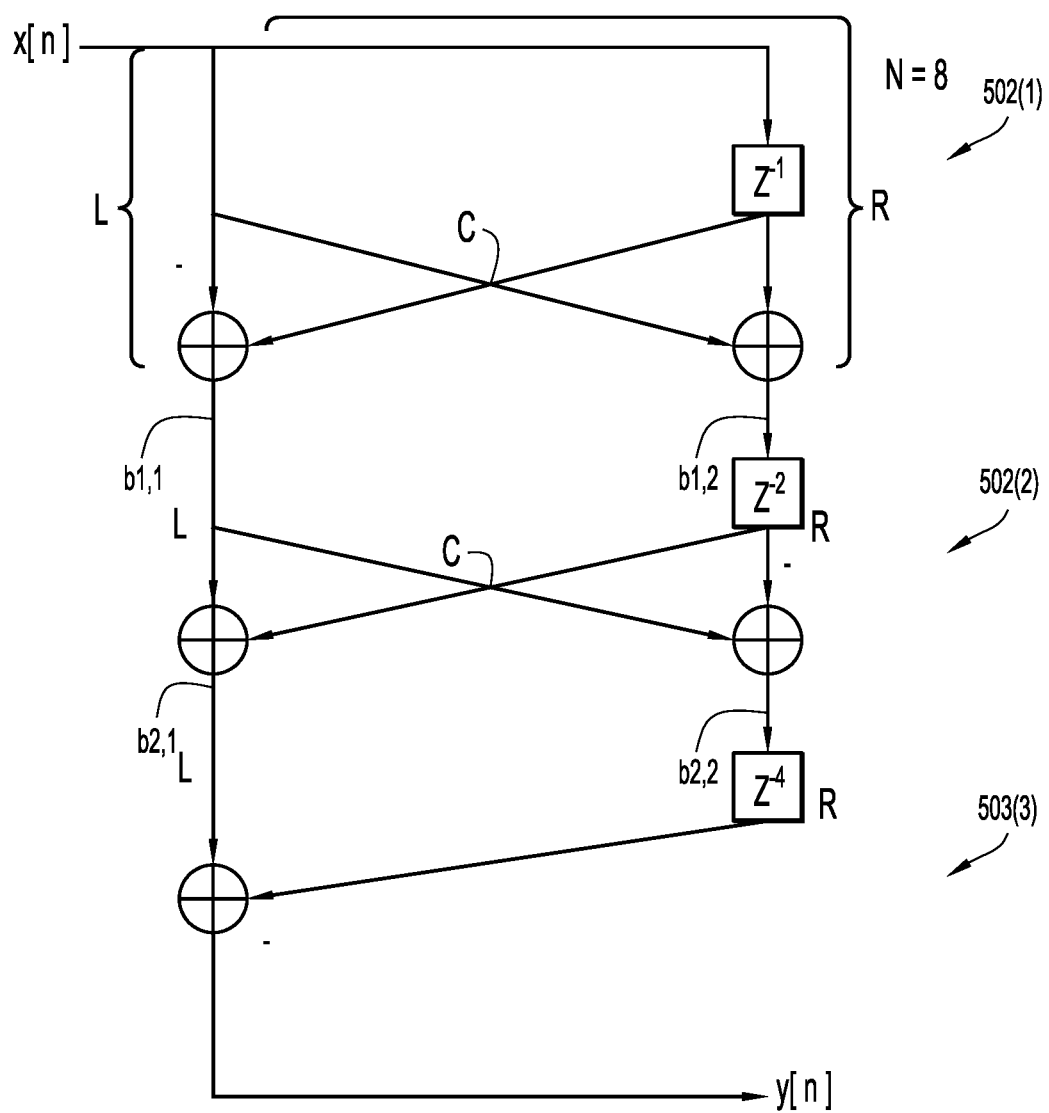
FIG. 5 is an illustration of a structure of a PONS correlator configured to correlate an input sequence against a PONS code having width N=8, according to an example embodiment.

With reference to FIG. 5, there is an illustration of an example structure 500 of PONS correlator 314 configured to correlate an input sequence against a PONS code having N=8, according to the generalized embodiment of FIG. 4. That is, structure 500 is an N=8 PONS correlator, according to the generalized embodiment of FIG. 4. In the example of FIG. 5, the PONS code to be encoded into structure 500 is row 3, $C_8$, of the N=8 PONS matrix from FIG. 1B (see table row R3 of FIG. 1B).

Given that N=8, structure 500 includes $\log_2(8)=3$ successive butterfly elements 502(1)-502(3) connected sequentially. The delay value of each sample delay z increase by a factor of 2 for each successive butterfly element.

From the N=8 PONS matrix, row 3, $C_8$:

$C_8 = [+ + - + + + + -]$.

The proposed structure is linear and time-invariant (LTI), thus it is fully described by its impulse response. Because a (real) correlation is a time-reversal of convolution, the system impulse response $h_8$ (i.e., the impulse response of structure 500) should be a time-reversal of row 3, $C_8$, giving:

Desired impulse response $h_8 = h[0] \ldots h[7] = [- + + + + - + +]$, where each successive element/value $h[i]$ (equal to either "−" or "+") of the impulse response (from left-to-right] is delayed by 1-sample delay with respect to the previous element, and where the first element h[0] has a zero delay.

So, the method determines placement of sample inversion in each left branch L and each right branch R so that impulses traversing paths through the butterfly elements 502(1), 502(2), and 502(3) experience a pattern of sample inversions that results in the desired impulse response $h_8$ that is a time reversal of the row of the PONS matrix against which correlations are to be made.

The impulse responses at output nodes of first branches L and right branches R as shown in FIG. 5 are:

{b1,1}: − + (0 delay, then 1-sample delay)
{b1,2}: + +
{b2,1}: − + + +
{b2,2}: − + − −

Finally, output y(n) is given by:

y[n]: [− + + + + − + +], which is a sequence of elements/values (referred to as "impulse response elements" or simply "elements") of the actual impulse response of the correlator when the sample inversions of the butterfly elements are configured to encode $C_8$ into the butterfly elements.

A method of determining where to place the sample inversions (e.g., inverters) in either left branch L or right branch R of each butterfly element to achieve the above actual impulse response is further described in connection with FIGS. 6-8. The method traces pairs of impulse responses through structure 500. The method makes $\log_2(N)+1$ decisions (four in this case), a first to place an inverter (i.e., sample inversion) in first butterfly element 502(1), a second to place an inverter in second butterfly element 502(2), a third to place an inverter in third butterfly element 502(3), and a fourth to determine whether to invert the final output. Because only 4 decision are made, it is unnecessary to test all elements of the impulse response. Rather, only elements having Path1 that traces through the left-side only (no delays) and Path2 that traces through the same path, except diverging into the right-side branch of exactly one butterfly, for each butterfly as described below.

For an input including a single, positive impulse, each element of the desired impulse response can travel only in one specific path along the structure/topology. This property is exploited by comparing two sets of paths, "Path 1" and "Path2," through the structure to see if their signs are equal or different, and by comparing their respective impulse response elements to see if those are equal or different. By moving the (mandatory) inverter to the left branch L of the "current" butterfly element, the relative polarity of Path1 vs. Path2 is flipped, if their relative polarity does not match the relative polarity of the corresponding impulse response elements. Otherwise, we move the inverter to the right branch of the current butterfly element. By convention, the method starts with first butterfly element 502(1), setting its parameters correctly (i.e., the placement of the inverter), then moving successively down the structure setting parameters for one butterfly element at a time as described next.

Figure 6:
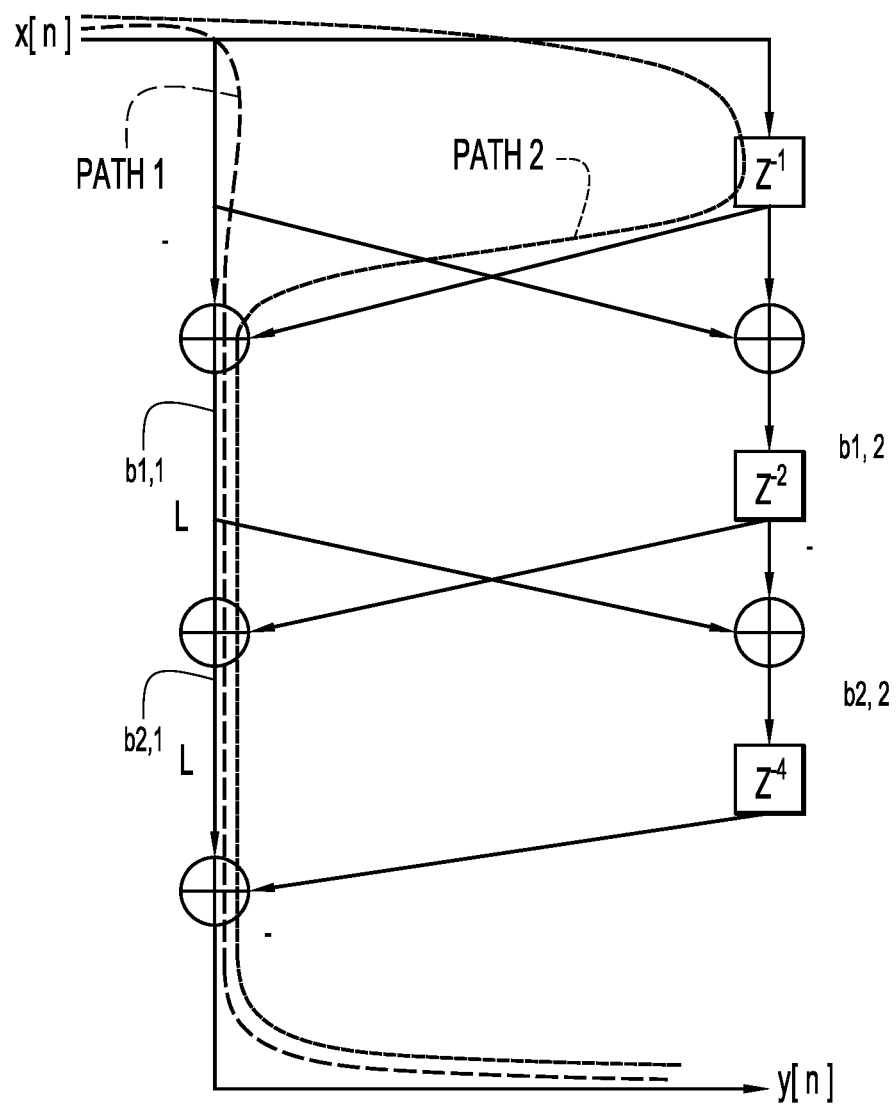
FIG. 6 is an illustration of processing paths for first and second elements of an impulse response in the PONS correlator of FIG. 5, according to an example embodiment.

With reference to FIG. 6, there is an illustration of Path1 and Path2 for first and second elements of the impulse response. It is desired that the first and second elements of the impulse response be "−" and "+", which have opposite polarity. Thus, the method places an inverter on left branch L of first butterfly element 502(1), to (temporarily) yield h[0]=−, h[0]=+.

Figure 7:
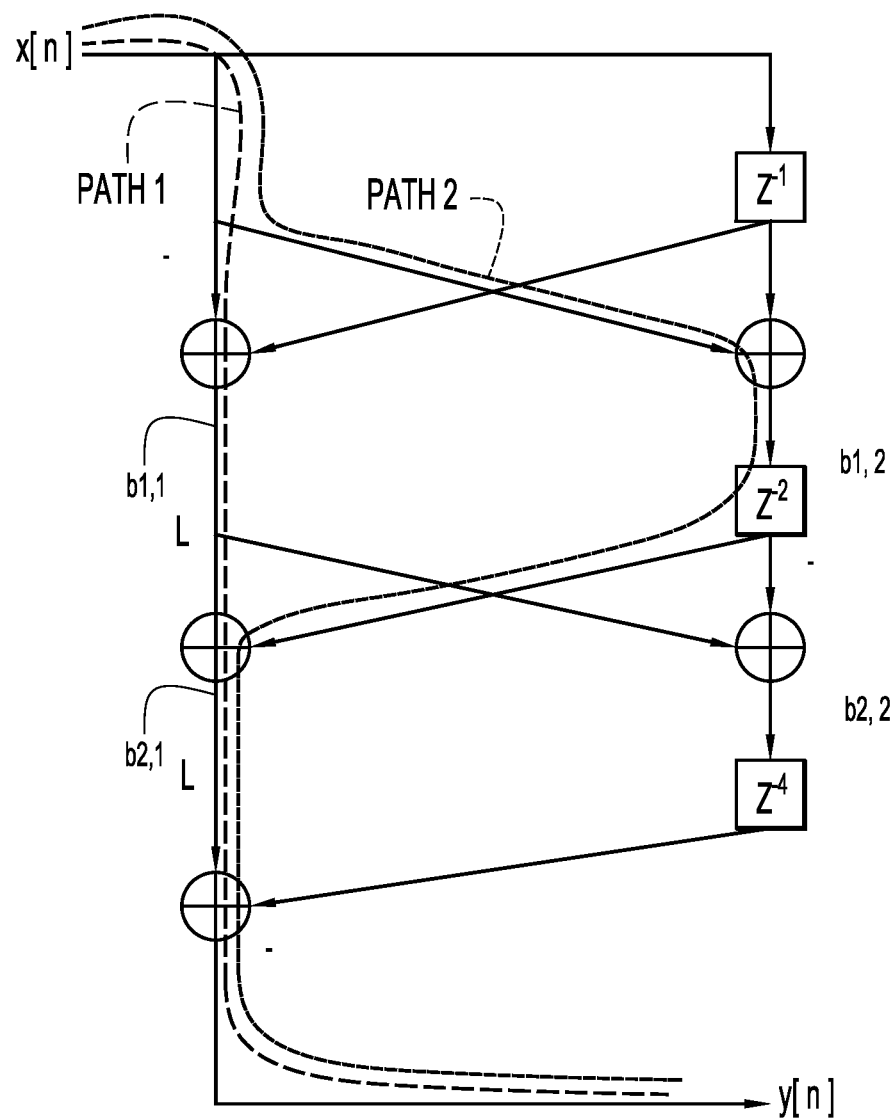
FIG. 7 is an illustration of processing paths for a first and third element of an impulse response in the PONS correlator of FIG. 5, according to an example embodiment.

With reference to FIG. 7, there is an illustration of Path1 and Path2 for the first and third elements of the impulse response. It is desired that the first and third elements of the impulse response be "−" and "+", which have opposite polarity. Since an inverter has already been placed in left branch L of first butterfly element 502(1), Path1 and Path2 also have opposite polarity. Accordingly, the method places an inverter on right branch R of butterfly element 502(2).

Figure 8:
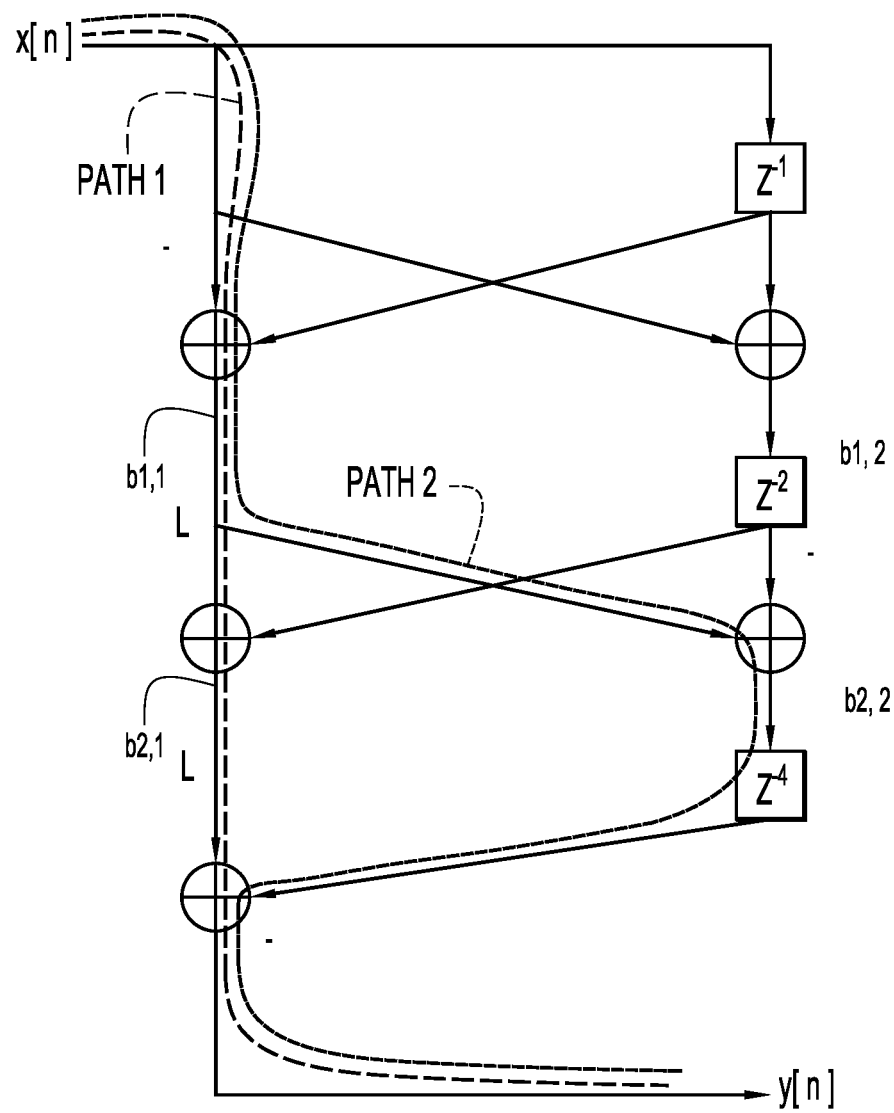
FIG. 8 is an illustration of processing paths for a first and fifth element of an impulse response in the PONS correlator of FIG. 5, according to an example embodiment.

With reference to FIG. 8, there is an illustration of routes Path1 and Path2 for the fifth element "+" of the impulse response. It is desired that the first and fifth element of the impulse response be "−" and "+", which have opposite polarity. Since the inverter was placed to the right in the second butterfly (502(2)), Path1 and Path2 have the same polarity. To compensate for this, the method places the inverter of the final butterfly 502(3) so as to invert the path1 signal path.

Finally, the method checks the absolute polarity of the h[0] impulse response element. If it has the incorrect polarity, the method places an inverter at the final output y[n], which is needed in structure 500.

Note that the operation (−path1+path2)*−1 can be replaced by path1−path2, as is suggested in FIG. 8 to reduce the operation to a single subtraction.

A summary method of constructing and configuring a PONS correlator to correlate an input signal against a PONS code, according to the generalized embodiment includes:

a. Choosing a number M of layers, i.e., M vertically stacked butterfly elements as shown in FIGS. 4 and 5, for example, where $M=\log_2(N=2^x)$, where N is the width of the PONS code/row from a PONS matrix to be encoded into the butterfly elements, and x is an integer.

b. Inserting one butterfly element per layer for all layers except a final layer. Inserting a partial butterfly element in the final layer.

c. Setting a delay value of a delay unit in each butterfly element of layer (i+1) to 2 times a delay value of layer (i), starting at delay=1.

d. Interconnecting the two output nodes of each butterfly element to respective ones of the two input nodes of the next layer (i.e., butterfly element).

e. Selectively inverting one branch of each butterfly element depending on the desired PONS row to encode/correlate against.

f. Terminating the final butterfly element by only one branch, possibly inverting its output.

The embodiments described may be used with a real input including samples from an arbitrary row of a PONS matrix of any power-of-two size; however, the embodiments may also be applied to a complex baseband suitable for quadrature modulation, as described in connection with FIGS. 2A and 3. In an example, converting real PONS elements into a complex baseband representation includes alternately interleaving N odd and even elements into an N/2 complex vector/stream. For example, a first row of an N=8 PONS, has the following real elements:

$PONS_8(1)$=[+1 +1 +1 −1 +1 +1 −1 +1].

The first row corresponds to the following complex baseband pilot including 4 complex chips:

Pilot=[1+i, 1−i, 1+i, −1 +i], where i is the imaginary unit for which $i^2$=−1

In transmitter 200, user encoder 208 and pilot generator 209 convert from real PONS elements to interleaved complex baseband. In receiver 300, projector 318 performs the corresponding inverse operation to convert any complex element [X+i*Y] to two real elements [X, Y] in a serial stream.

Also, complex correlation may be substituted by complex convolution, as long as the set of coefficients encoded into the complex correlator are time-reversed and conjugated, as follows:

Complex impulse response=[−1 −i, 1−i, 1+i, 1−i] (4 complex chips).

Figure 9:
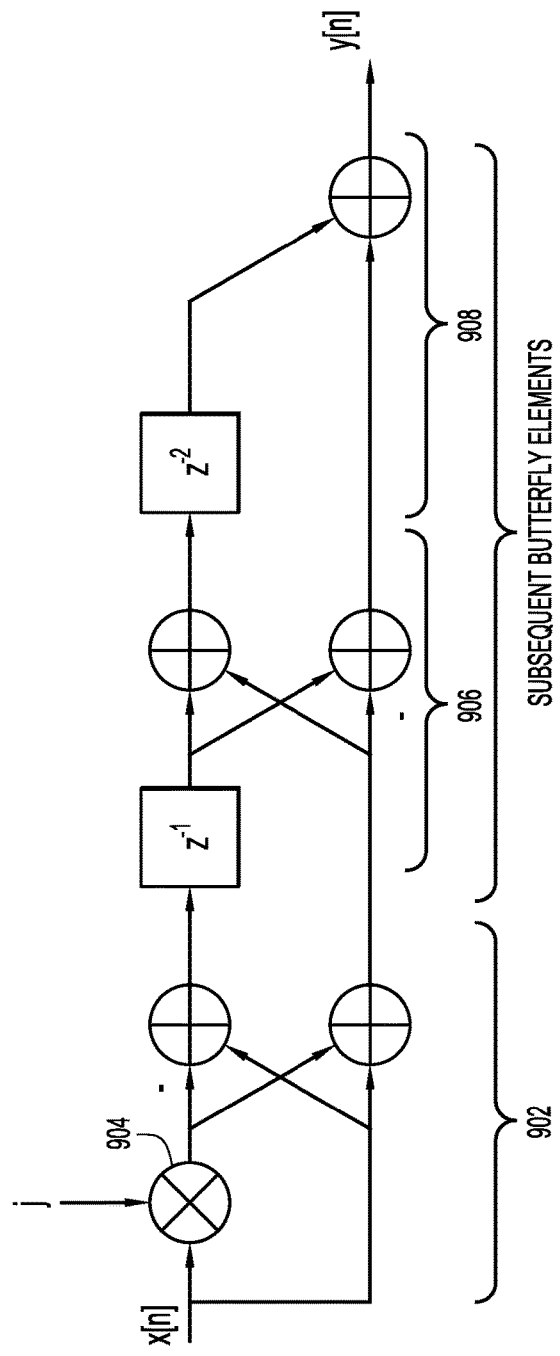
FIG. 9 is an illustration of a structure of the PONS correlator that represents a complex PONS correlator, according to an example embodiment.

Thus, the embodiments described above for correlating against a row of the PONS matrix may also be used for the complex baseband case with only minor modification, as shown in FIG. 9.

With reference to FIG. 9, there is an illustration of an example structure 900 of PONS correlator 314 configured as a complex correlator to operate with the complex pilot and the complex impulses response corresponding to $PONS_8(1)$ (4 complex chips), as described above. FIG. 9 also shows a table having PONS row elements in the first column, corresponding complex correlator template elements p in the second column, and corresponding complex convolutional coefficients h in the third column, where each coefficient h is the time-reversal and conjugate of the corresponding correlator template element p. For example, for row elements r1-r8, then p1-p4 represent the (complex) correlator template, where p1=r1+i*r2, p2=r3+i*r4, and so on. Then, h1-h4 represent the corresponding (complex) convolution coefficients, i.e. the time-reversal and conjugate form of p1-p4, where h1=conj(p4), h2=conj(p3), and so on.

Structure 900 includes a first butterfly element 902 that includes a complex multiplier 904 to perform complex multiplication by the imaginary number, i (represented as a "j" signal in FIG. 9), in place of a delay unit. Subsequent butterfly elements 906, 908 (which includes only a partial butterfly element) include the usual delay units to implement 1-sample delay, 2-sample delay, and so forth, as described in the previous embodiments. Also, all real additions, subtractions, and delay units are replaced by their complex counterparts. The previous embodiments/methods described above for placing the inverters may be used in the complex correlator without modification.

PONS Correlators with Phase Rotations. Including Doppler Correlator Bank

The term "Doppler filterbank" is established in fields such as radio communication and radar for duplicating a correlator/matched filter template a number of times with different time-warp factors (i.e., phase rotations) in order to track Doppler shift (typically transmitter, receiver or target movement). The term is reused here due to the similarity in function, even though the focus here is to address transmitter-receiver clock differences. More specifically, embodiments presented below implement Doppler filterbanks based on the correlator structures described above. The Doppler filterbanks are also referred to as Doppler correlator banks.

When a delay line correlator structure (e.g., correlator structure 900) correlates against a receive signal that has been subjected to a clock offset/frequency error between transmitter 102 and receiver 104, such as Doppler movement or some other linear time-base dilation/compression, the clock offset may be tracked or matched in the delay line structure by performing in the delay line structure a complex rotation of time history that follows the function:

$$r(n) = e^{j2\pi(\Delta_0 + n\Delta)},$$

where n is an index into the delay line and $\Delta_0$ centers the rotation about a midpoint:

$$\Delta_0 = -\frac{N-1}{2}$$

Delta ($\Delta$) may be thought of as the expected complex phase rotation between two consecutive samples of x[n] (e.g., complex spread spectrum chips) for a given linear clock drift.

Figure 10:
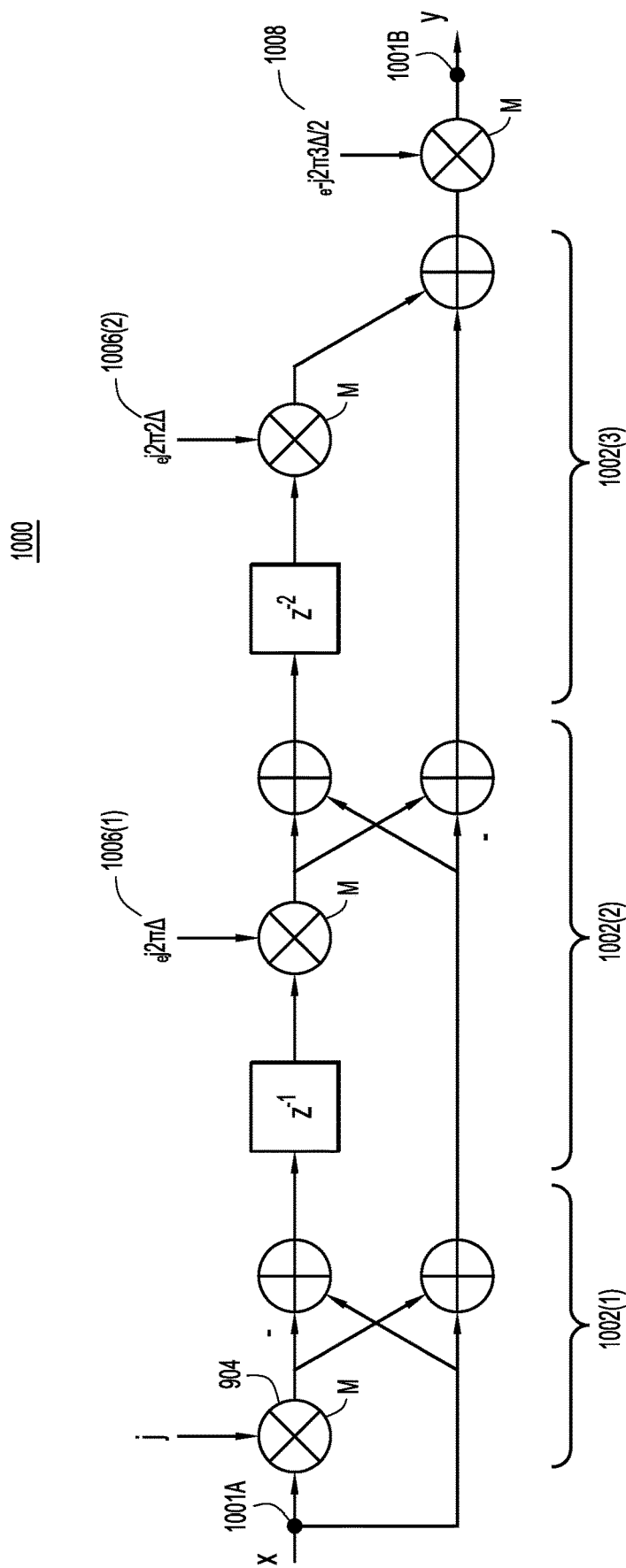
FIG. 10 is a block diagram of a Doppler correlator based on the PONS correlator of FIG. 9 and that includes phase rotation, according to an example embodiment.

Operations that perform phase rotation may be performed efficiently in a correlator structure similar to correlator structure 900, as shown in FIG. 10.

With reference to FIG. 10, there is a block diagram of an example Doppler correlator 1000 (also referred to as a "Doppler correlator bin 1000") that includes the above-mentioned phase rotation operations. The structure of Doppler correlator 1000 is based on correlator structure 900, but extended to include phase rotation to produce frequency shift to match the above-mentioned clock offset/frequency error. Doppler correlator 1000 includes an input node 1001A to receive input sequence x[n] ("x"), an output node 1001B to output phase shifted correlation results y[n]("y"), and successive butterfly elements 1002(1), 1002(2), and 1002(3) (where butterfly element 1002(3) is a partial butterfly element), connected one-to-the next between the input node and the output node. Similar to correlator structure 900, each butterfly element 1002(i) includes cross-coupled first and second branches that collectively include sample adds, a sample delay, and a sample inversion. Sample delays D double in each successive butterfly element 1002(i). Similar to the correlator structures described above in connection with FIGS. 4-9, Doppler correlator 1000 selectively positions the sample inversion in either the first branch or second branch of each butterfly element 1002(i), in a predetermined pattern across the butterfly elements, so as to encode the individual positive/negative values of a PONS code (sequence) into and across the butterfly elements.

To impose the above mentioned phase rotation, Doppler correlator 1000 includes successive complex phase rotators 1006(1), 1006(2) distributed among successive butterfly elements 1002(1), 1002(2), respectively. Successive phase rotators 1006(1), 1006(2) follow respective ones of the sample delays of successive butterfly elements 1002(1), 1002(2), and may each include a multiplier M to multiply a correlation result (output by a previous butterfly element) by a phase shift $e^{j2\pi i\Delta}$, where i takes on different values. Other arrangements for implementing the phase rotation are possible. In the example of FIG. 10, successive phase rotators 1006(1), 1006(2) apply successive phase rotations $e^{j2\pi\Delta}$, $e^{j2\pi 2\Delta}$, which double in value with each successive phase rotator. Thus, at a high-level, Doppler correlator 1000 is said to be configured with one or more phase rotations that the Doppler correlator applies to complex samples (e.g., via one or more phase rotators 1006(1), 1006(2)) that are shifted through butterfly elements 1002(1), 1002(2). A total phase rotation applied by Doppler correlator 1000 to input samples x[n] is a sum or accumulation of the successive, individual/component, phase rotations applied by successive phase rotators 1006(1), 1006(2).

Doppler correlator 1000 also includes an optional "output" phase rotator 1008 coupled between an output of last stage butterfly element 1002(3) and output node 1001B. Optional phase rotator 1008 applies an output phase rotation (e.g., $e^{-2\pi 3\Delta/2}$) that represents a partial phase rotation in a reverse direction to phase rotations 1006(1), 1006(2). Optional phase rotator 1008 may be omitted in some implementations.

In operation, successive butterfly elements 1002(1)-1002(3) correlate input samples x[n] applied to input node 1001A against the PONS code encoded into the successive butterfly elements, and successive phase rotators 1006(1), 1006(2) apply successive phase rotations to (i.e., phase rotate) the input samples, as the input samples are shifted through the successive butterfly elements, to produce correlation results y[n] centered on a frequency offset (e.g., from a reference frequency of input samples x[n], such as the reference frequency of transmitter timebase TTB) that corresponds to an accumulation of the phase rotations. In this way, Doppler correlator 1000 forms a "Doppler correlator bin" centered on the frequency offset, i.e., the Doppler correlator bin produces correlation results y[n] centered on the frequency offset. Increasing or decreasing a magnitude of the phase rotations results in correspondingly increasing and decreasing the frequency offset. Also, applying the phase rotations in a positive direction or a negative direction, i.e., applying positive phase rotations or negative phase rotations, results in a frequency offset that is correspondingly positive or negative relative to a zero frequency offset.

Doppler correlator 1000 may be replicated with different phase rotations in each replication, i.e., with phase rotations that vary across the replications, to produce a number of Doppler correlator bins centered at different frequency offsets of interest corresponding to the different phase rotations. Collectively, the multiple Doppler correlator bins form a bank of Doppler correlators, i.e., a Doppler correlator bank, as shown in FIG. 11.

Figure 11:
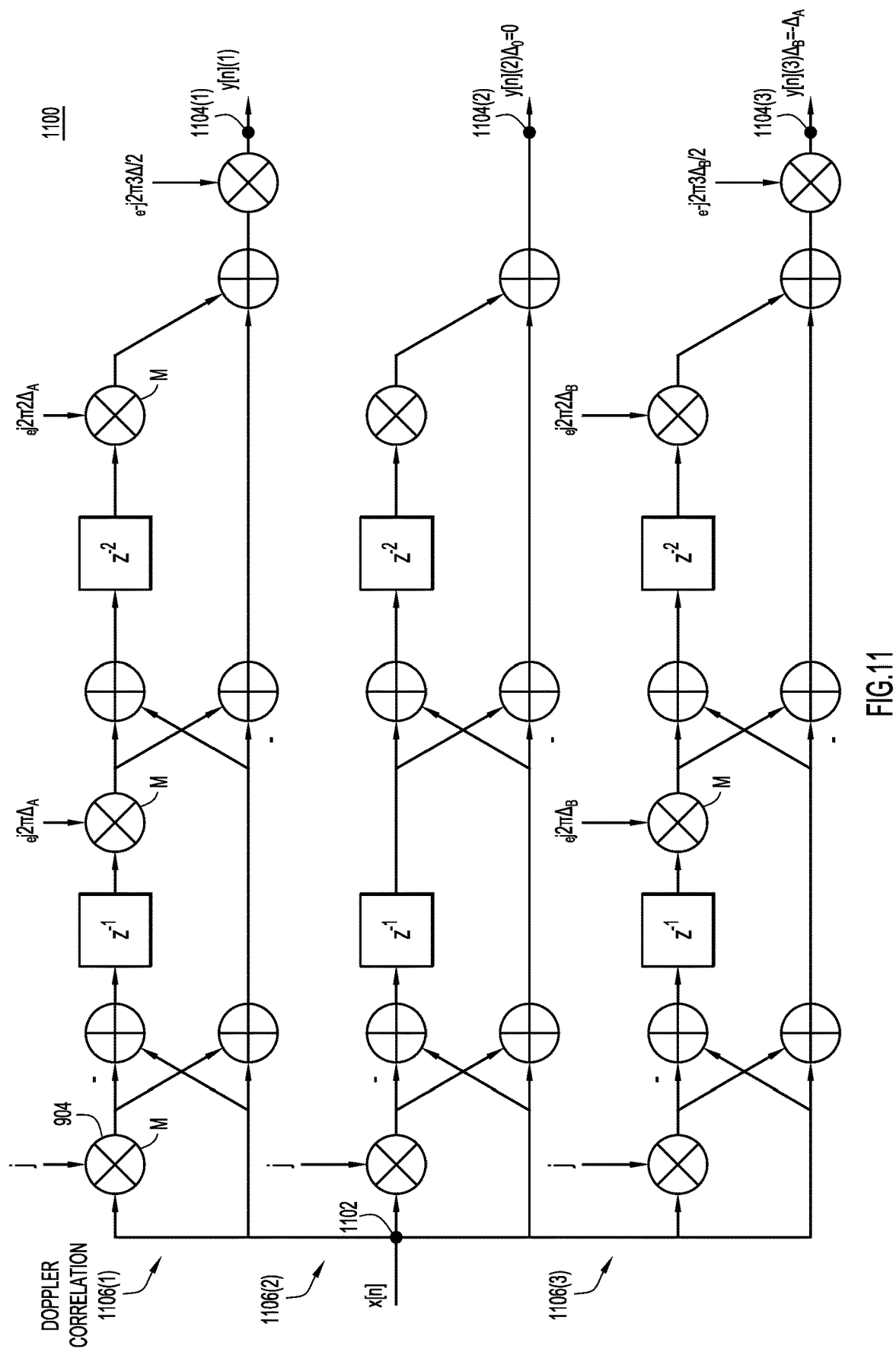
FIG. 11 is a block diagram of a three bin Doppler correlator bank based on replication of the Doppler correlator of FIG. 10, according to an example embodiment.

With referenced to FIG. 11, there is a block diagram of an example three bin Doppler correlator bank 1100 that replicates Doppler correlator 1000. It is understood that the three bins may be extended to many more bins. Doppler correlator bank 1100 includes an input node 1102, first, second, and third output nodes 1104(1), 1104(2), and 1104(3), and first, second, and third Doppler correlators 1106(1), 1106(2), and 1106(3) connected in parallel between the input node and respective ones of output nodes 1104(1), 1104(2), and 1104(3). Doppler correlators 1106(1), 1106(2), and 1106(3) each encode the same PONS code. Doppler correlators 1106(1) 1106(2) are each configured and operate similarly to Doppler correlator 1000, while Doppler correlator 1106(2) is configure and operates similarly to Doppler correlator 900.

In operation, Doppler correlators 1106(1), 1106(2), and 1106(3) respectively correlate input samples x[n] against the same PONS code and (ignoring the optional output phase rotations) respectively apply phase rotations ($\Delta_A$ and $2\Delta_A$ for a maximum of $3\Delta_A$), 0, and ($\Delta_B$, $2\Delta_B$ for a maximum of $3\Delta_B$, where $\Delta_B = -2\Delta_A$) to the input samples, to produce correlation results y[n](1), y[n](2), and y[n](3) centered on respective frequency offsets f, 0, and −f, respectively. In other words, Doppler correlators 1106(1), 1106(2), and 1106(3) form Doppler correlator bins centered on frequency offsets f, 0, and −f. Doppler correlators 1106(1), 1106(2), and 1106(3) represent multiple parallel correlator paths or processing paths of Doppler correlator bank 1100. As used herein, the term parallel is synonymous with "concurrent." More generally, the Doppler correlator bank may include Doppler correlator configured with respective phase rotations that include zero, one or more positive, and one or more negative phase rotations, which result in correlation results centered on respective frequency offsets that include zero, one or more positive, and one or more negative frequency offsets.

In practice, initial stage or left-most butterfly elements in each Doppler correlator bin **1106(*i*) introduce relatively small-scale phase distortion due to the relatively small sample delay $z^{-1}$ associated with the initial stage butterfly elements. In contrast, later stage or right-most butterfly elements of each Doppler correlator 1106(*i*) introduce relatively larger-scale phase distortion due to the relatively large sample delay $z^{-2}$ associated with the later stage butterfly elements (compared to the initial stage butterfly elements), because phase distortion due to frequency offset grows with time. Keeping this in mind, an approximation to Doppler correlator 1100 omits phase compensation of the small-scale phase distortions, i.e., omits the phase rotation in the initial stage, and only applies phase rotation in the later stage butterfly elements to compensate for the large-scale phase distortion. The approximation to Doppler correlator 1100 shares intermediate results from the initial stages (that do not compensate for phase distortion) among the later stages of the Doppler correlator bins, which do provide compensation. The approximation to Doppler correlator 1100** provides sufficient accuracy in terms of compensation for phase distortion, while significantly reducing computational complexity.

Figure 12:
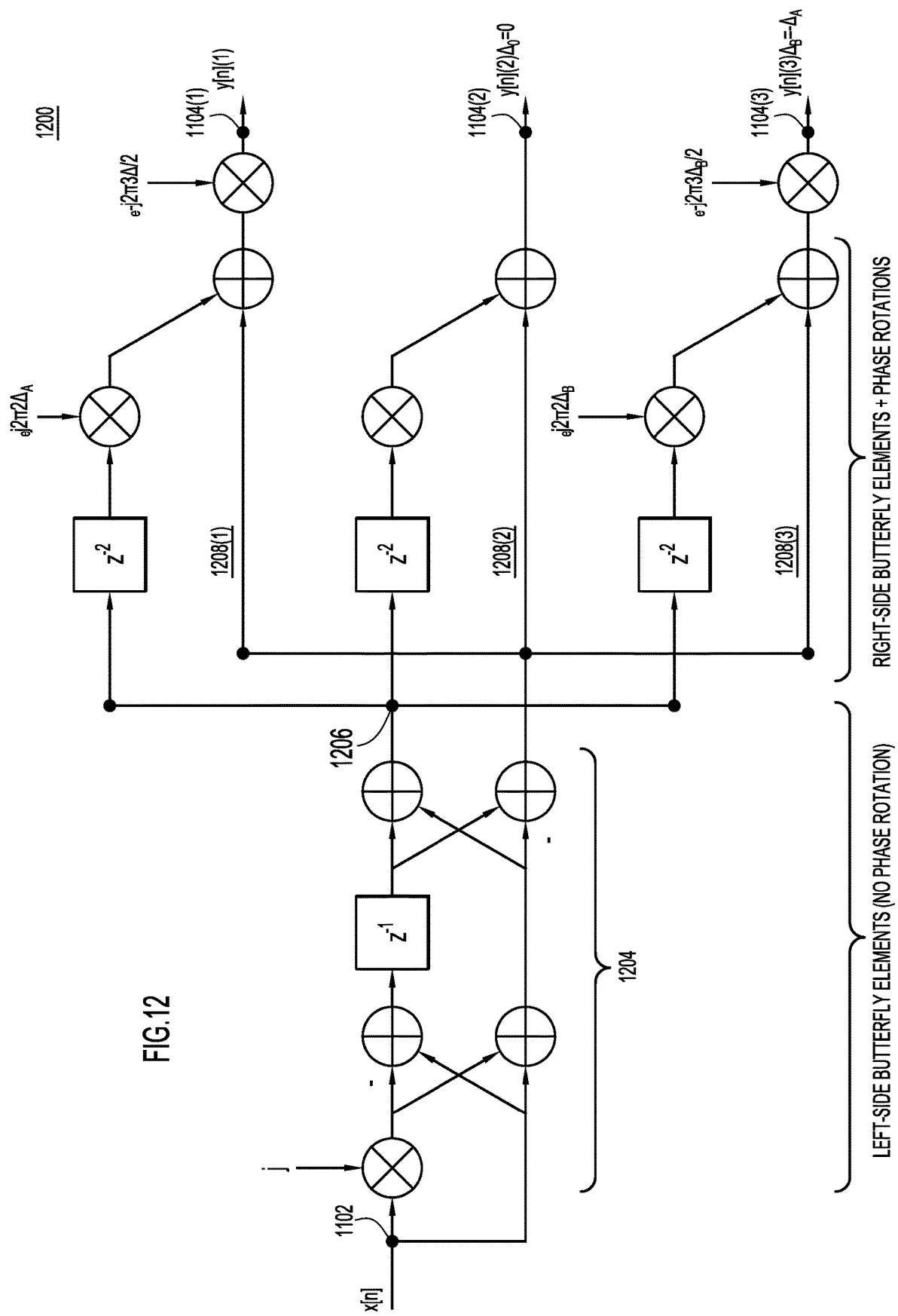
FIG. 12 is a block diagram of an efficient Doppler correlator bank that approximates the Doppler correlator bank of FIG. 11, according to an example embodiment.

Doppler correlator bank 1100 may be transformed to a simplified, more efficient Doppler correlator bank (i.e., the approximation to Doppler correlator 1100) shown in FIG. 12. With reference to FIG. 12, there is a block diagram of an efficient Doppler correlator bank 1200 that approximates Doppler correlator bank 1100, i.e., Doppler correlator bank 1200 is derived from Doppler correlator bank 1100. Doppler correlator bank 1200 is simpler and more computationally efficient than Doppler correlator bank 1100.

Referring to both FIGS. 11 and 12, the following modifications may be made to Doppler correlator bank 1100 to arrive at Doppler correlator 1200:

a. Retain center, zero-offset Doppler correlator 1106(2) from Doppler correlator bank 1100 in its entirety, i.e., retain the butterfly elements and the phase rotations of both the left-side and right-side butterfly elements of the zero-offset Doppler correlator. The left-most butterfly elements perform sub-correlations of the input samples x[n] to produce intermediate correlation results.

b. Omit the left-side butterfly elements and phase rotations from Doppler correlator 1106(1), but retain the right-side butterfly elements and phase rotations of that Doppler correlator. The retained components correlate and apply phase rotations to the intermediate correlation results, to produce frequency-offset correlation results.

c. Omit the left-side butterfly elements and phase rotations from Doppler correlator 1106(3), but retain the right-side butterfly elements and phase rotations of that Doppler correlator. The retained components correlate and apply phase rotations to the intermediate correlation results, to produce frequency-offset correlation results.

As a result of the above modifications, Doppler correlator 1200 includes left-side or initial-stage butterfly elements 1204 without phase rotation (retained from Doppler correlator 1106(2)) coupled between input node 1102 and an intermediate node 1206. Doppler correlator 1200 also includes respective right-side sets 1208(1), 1208(2) (retained from Doppler correlator 1106(2)), and 1208(3) of butterfly elements coupled in parallel with each other between intermediate node 1206 and output nodes 1104(1), 1104(2) and 1104(3), respectively. Right-side sets of butterfly elements 1208(1), 1208(2), and 1208(3) include butterfly elements or partial butterfly elements and phase rotations $2\Delta_A$, 0, and $2\Delta_B$, to form the three Doppler correlator bins for respective frequency offsets f, 0, and −f. The butterfly elements of initial-stage butterfly elements 1204 and each set of butterfly elements 1208(i) collectively encode the same PONS code for each of the three Doppler correlator bins. In summary, in Doppler correlator 1200, non-zero phase-warping on single-sample distances (the left-side set of butterfly elements) is skipped (rather re-using the non-warped operations from the zero-Doppler-shift central bin), while phase warping is carried out on the dual-sample distances calculated on the right-side of the structure (i.e., the right-side set of butterfly elements), thus leading to an "approximate" Doppler correlator bank for Doppler correlator bank 1100.

More generally, Doppler correlator 1200 includes:
a. A first Doppler correlator that includes left-side butterfly elements 1204, and right-side butterfly elements and non-zero phase rotation 1208(1).
b. A second Doppler correlator that includes left-side butterfly elements 1204, and right-side butterfly elements and zero-phase rotation 1208(2).
c. A third Doppler correlator that includes left-side butterfly elements 1204, and right-side butterfly elements and non-zero phase rotation 1208(3).

Thus, the successive butterfly elements of each Doppler correlator include (i) one or more first (left-side) butterfly elements (e.g., 1204) that are the same across all of the Doppler correlators, and that produce intermediate correlation as a result of samples x[n] being shifted through the one or more first butterfly elements, and (ii) one or more respective second (right-side) butterfly elements (e.g., 1208(i)) following the one or more first (left-side) butterfly elements and that are different for each Doppler correlator, the one or more respective second (right-side) butterfly elements configured to process the intermediate correlation results as the intermediate correlation results are shifted through the one or more respective second (right-side) butterfly elements, to produce the respective correlation results for each Doppler correlator. Two of the Doppler correlators include non-zero phase rotation confined to and distributed among their right-side butterfly elements. Even more generally, at least some of the successive butterfly elements (e.g., 1204) of each of the first, second, and third Doppler correlators are the same across all of the first, second, and third Doppler correlators, and at least some of the successive butterfly elements (e.g., 1208i)) of each of the first, second, and third Doppler correlators are different from the successive butterfly elements of other ones of the first, second, and third Doppler correlators.

In operation, in Doppler correlator 1200, initial-stage butterfly elements correlate input samples x[n] applied to input node 1102 as the input samples are shifted through the butterfly elements, to produce intermediate correlation results without any phase rotation. Then, in parallel, right-side sets 1208(1), 1208(2), and 1208(3) respectively process/correlate the intermediate correlation results, and apply respective phase rotations to the intermediate correlation results, as the intermediate correlation results are shifted through the right-side sets to produce respective correlation results y[n](1), y[n](2), and y[n](3) with phase offsets $2\Delta_A$, 0, and $2\Delta_B$, corresponding to frequency offsets of f, 0, and −f, respectively.

An example implementation of a Doppler correlator bank includes 13 uniform Doppler correlator bins from −150 ppm to +150 ppm, and performs phase rotation in the final two butterfly elements (of the right-side butterfly elements) only. As mentioned above, the final per-bin complex rotation can be eliminated as it does not affect the magnitude of the correlation results, and thus does not affect the result of a magnitude-based peak search in two-dimensional (2D) Doppler-time space performed by peak detector 316 (described below in connection with FIG. 13). Thus, the practical cost for branching out the last two butterfly elements into a Doppler correlator bank is usually 2 complex rotations and 3 complex adds per Doppler bin and per processed sample. It is understood that the same general method described may be used for only 1 butterfly element, or any larger number of butterfly elements, the trade-off being one of accuracy vs. computational/structural complexity. If tracking of larger time dilation/compression is desired, the sample value of the sample delays can be increased or decreased (on a per Doppler correlator bin-basis) in an analogous manner to the depicted phase changes, commensurate with the corresponding dilation/compression.

At the suggested complexity trade-off, the added computational cost for each Doppler correlator bin is 2 complex multiplies (assuming that the final rotation is dropped) and 3 complex additions (2*6+3*2=18 real FLOPs). The cost of doing the corresponding full resampled parallel correlation would be N complex multiplies and N−1 complex adds. For N=256, that is 256*6+255*2=2046 real FLOPs, for a factor of 2046/18~114× in arithmetic complexity. Both numbers scale proportionately with the number of Doppler correlator bins. The baseline correlation scales proportionately with N, while this method does not scale with N (being a constant cost irrespective of PONS order).

In an example implementation for direct sequence spread spectrum (DSSS):
Chip period, $$\tau_{chip} = \frac{1}{1024} \text{ seconds,}$$

Pilot length, N=256 (complex) DSSS chips, 256 ms,
Modulation frequency, $f_{carrier}$ ($f_c$)=18500 Hz, $$\Delta = D \times f_{carrier} \times \tau_{chip} = \text{ppm} \times 1e^{-6} \times f_{carrier} \times \tau_{chip},$$

Inserting into the above formula for delta, a full Doppler correlator bank (similar to Doppler correlator bank 1100) starting at −150 ppm and incrementing at 25 ppm steps to +150 ppm would use yields the following table:

| PPM | Δ | 2Δ | 4Δ | ... | $\frac{N}{2}\Delta$ | $-\frac{N-1}{2}\Delta$ |
|---|---|---|---|---|---|---|
| −150 | −0.0027 | −0.0054 | −0.0108 | | −0.3469 | −0.3455 |
| −125 | −0.0023 | −0.0045 | −0.0090 | | −0.2891 | −0.2879 |
| ... | | | | ... | | |
| 0 | 0 | 0 | 0 | | 0 | 0 |
| ... | | | | | | |
| +150 | 0.0027 | 0.0054 | 0.0108 | | 0.3469 | 0.3455 |

For the reduced number of butterfly elements (for a Doppler correlator similar to 1200) the above parameters reduce to:

| PPM | Δ | ... | $\frac{N}{8}\Delta$ | $\frac{N}{4}\Delta$ | $\frac{N}{2}\Delta$ | $-\frac{N-1}{2}\Delta$ |
|---|---|---|---|---|---|---|
| −150 | | | | −0.1734 | −0.3469 | |
| −125 | | | | −0.1445 | −0.2891 | |
| ... | | | | ... | | |
| 0 | 0 | | 0 | 0 | 0 | |
| ... | | | | | | |
| +150 | | | | 0.1734 | 0.3469 | |

Receiver Peak Detector

Figure 13:
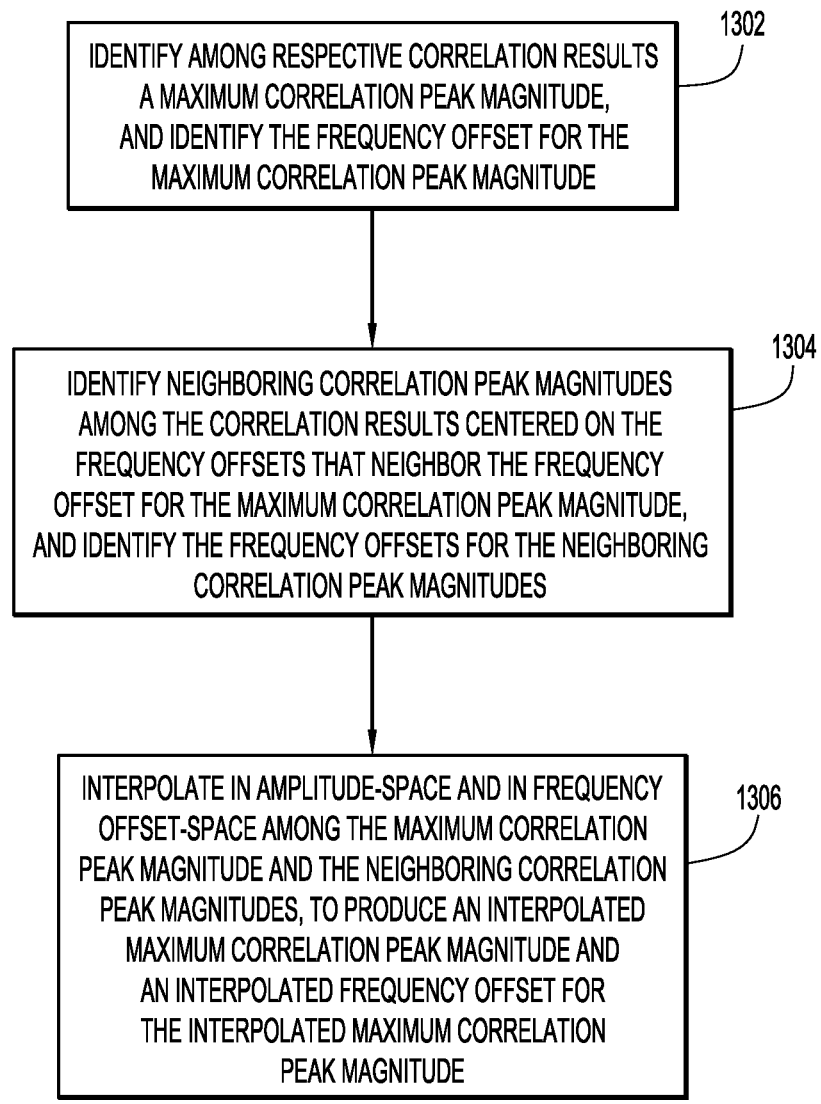
FIG. 13 is a flowchart of a method performed by a peak detector of the spread spectrum acoustic receiver, according to an example embodiment.

With continued reference to FIGS. 11 and 12, and also referring to FIG. 13, the above-mentioned Doppler correlator banks 1100/1200 feed correlation results y[n](1), y[n](2), and y[n](3) to peak detector 316. Peak detector 316 identifies first, second, and third correlation magnitude peaks and their corresponding time indexes in correlation results y[n](1), y[n](2), and y[n](3). In other words, peak detector 316 identifies correlation peaks corresponding to frequency offsets f, 0, and −f. Peak detector 316 provides a three-peak vector (e.g., magnitude and time index for each correlation peak) identifying the three correlation peaks to a peak interpolation function of the peak detector. The three correlator peaks indicate coarse frequency offsets f, 0, and −f, because the actual frequency offset may not be aligned precisely with frequency bins f, 0, and −f. Thus, the peak interpolation function performs an interpolation of a 3-sample neighborhood surrounding the single maxima across frequency, to produce an interpolated correlation peak at an interpolated frequency offset and time index, which may be fractionally frequency offset from any one of frequency bins f, 0, and −f. The peak interpolation function provides the interpolated frequency offset and time index to sample/equalizer 312 and projector 318, which use the interpolated information (frequency offset and time index) to form precise user projections of user codes against receive energy in time slots occupied by transmitted user codes.

With reference to FIG. 13, there is a flowchart of an example method 1300 performed by peak detector 316, that generalizes the operations described above.

At 1302, peak detector 316 identifies among the respective correlation results from the Doppler correlator bank a maximum correlation peak magnitude, and identifies the frequency offset/Doppler correlator for the maximum correlation peak magnitude.

At 1304, peak detector 316 identifies neighboring correlation peak magnitudes among the correlation results centered on the frequency offsets that neighbor the frequency offset for the maximum correlation peak magnitude, and identifies the frequency offsets/Doppler correlators for the neighboring correlation peak magnitudes.

At 1306, peak detector 316 interpolates in magnitude-space and in frequency offset-space among the maximum correlation peak magnitude and the neighboring correlation peak magnitudes, to produce an interpolated maximum correlation peak magnitude and an interpolated frequency offset for the interpolated maximum correlation peak magnitude. Peak detector 316 provides the interpolated information (timing, frequency offset) to subsequent operation used to generate user code projections based on the interpolated information.

Generalized Method to Construct Approximate Doppler Correlator Bank

Based on the embodiments described above, a generalized approximate linear Doppler correlator bank may be constructed in accordance with the following generalized sequence of operations:

a. Define a Doppler correlator bank based on a template that includes a complex baseband PONS row modulated by a linearly swept complex phase as a function of Doppler shift (clock drift).

b. Replace each Doppler correlator bin by an efficient PONS butterfly element topology that performs "small scale" sub-correlations (e.g., performed in 1204) first, followed by "large scale" sub-correlations (e.g., performed in 1208(*i*)).

c. Remove non-zero Doppler shift small-scale sub-correlations, rather re-using the zero-shift results.

d. Perform a (magnitude) 2D peak search across Doppler correlator bins as well as within each bins' temporal output to find the (frequency shift, time) index of the actual maximum correlator peak.

e. Select the 3-element vector consisting of the peak value from (d) and its immediate Doppler correlator bin neighbors. Perform a quadratic interpolation to produce a fractional Doppler estimate of higher resolution than the bin spacing. Complex phase angle estimate is copied directly from the magnitude maxima.

f. Use the estimated Doppler shift to produce a complex phase angle sweep when projecting a block of chips for decoding.

Example Processor

Figure 14:
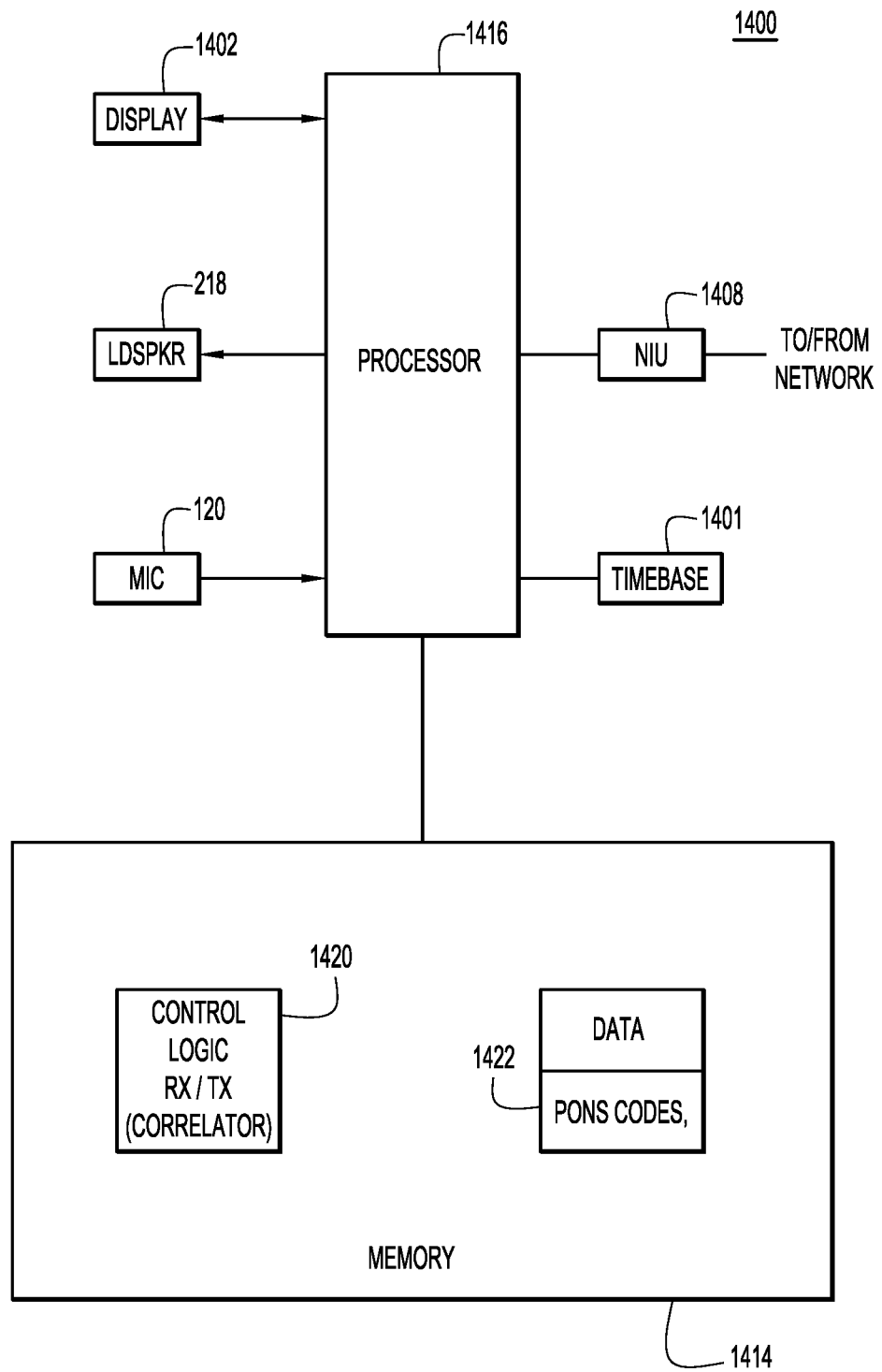
FIG. 14 is a block diagram of a communication device in which the spread spectrum acoustic transmitter and the spread spectrum acoustic receiver, and the PONS correlator, may be implemented, according to an example embodiment.

With reference to FIG. 14, there is a block diagram of an example communication device 1400 in which transmitter 102, receiver 104, or both may be implemented. There are numerous possible configurations for device 1400 and FIG. 14 is meant to be an example. Examples of device 1400 include a tablet computer, a personal computer, a laptop computer, a mobile phone, such as a smartphone, or a video conference endpoint. Device 1400 may include a timebase 1401, display 1402, loudspeaker 218, microphone 302, one or more network interface units (NIUs) 1408, and memory 1414 each coupled to a processor 1416. The one or more NIUs 1408 may include wired and/or wireless connection capability that allows processor 1416 to communicate over a communication network. For example, NIUs 1408 may include an Ethernet card to communicate over an Ethernet connection, a wireless RF transceiver to communicate wirelessly with cellular networks in the communication network, optical transceivers, and the like, as would be appreciated by one of ordinary skill in the relevant arts.

Processor 1416 may include a collection of microcontrollers and/or microprocessors, for example, each configured to execute respective software instructions stored in the memory 1414. Processor 1416 may be implemented in one or more programmable application specific integrated circuits (ASICs), firmware, or a combination thereof. The collection of microcontrollers may include, for example: a video controller to receive, send, and process video signals or images related to display 1402; an acoustic processor to receive, send/transmit, and process acoustic/sound signals related to loudspeaker 218 and microphone 302 as described herein; and a high-level controller to provide overall control. Portions of memory 1414 (and the instructions therein) may be integrated with processor 1416. As used herein, the terms "acoustic" and "sound" are synonymous and interchangeable.

The memory 1414 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1414 may comprise one or more computer readable storage media (e.g., a memory device) encoded with software comprising computer executable instructions and when the software is executed (by the processor 1416) it is operable to perform the operations described herein. For example, the memory 1414 stores or is encoded with instructions for control logic 1420 to perform operations described herein related to transmitter 102 and receiver 104, e.g., to implement PONS correlator 314 with or without phase rotation. In an example, control logic 1420 causes processor to instantiate/implement PONS correlator 314, and configure the correlator with, e.g., encode the correlator with, a particular row of a PONS matrix against which the correlator correlates input samples, and with phase rotations to be applied to the input samples.

In addition, memory 1414 stores data/information 1422 used and generated by logic 1420, such as PONS codes, phase rotations, input samples, correlation results, and so on.

Plot

Figure 15:
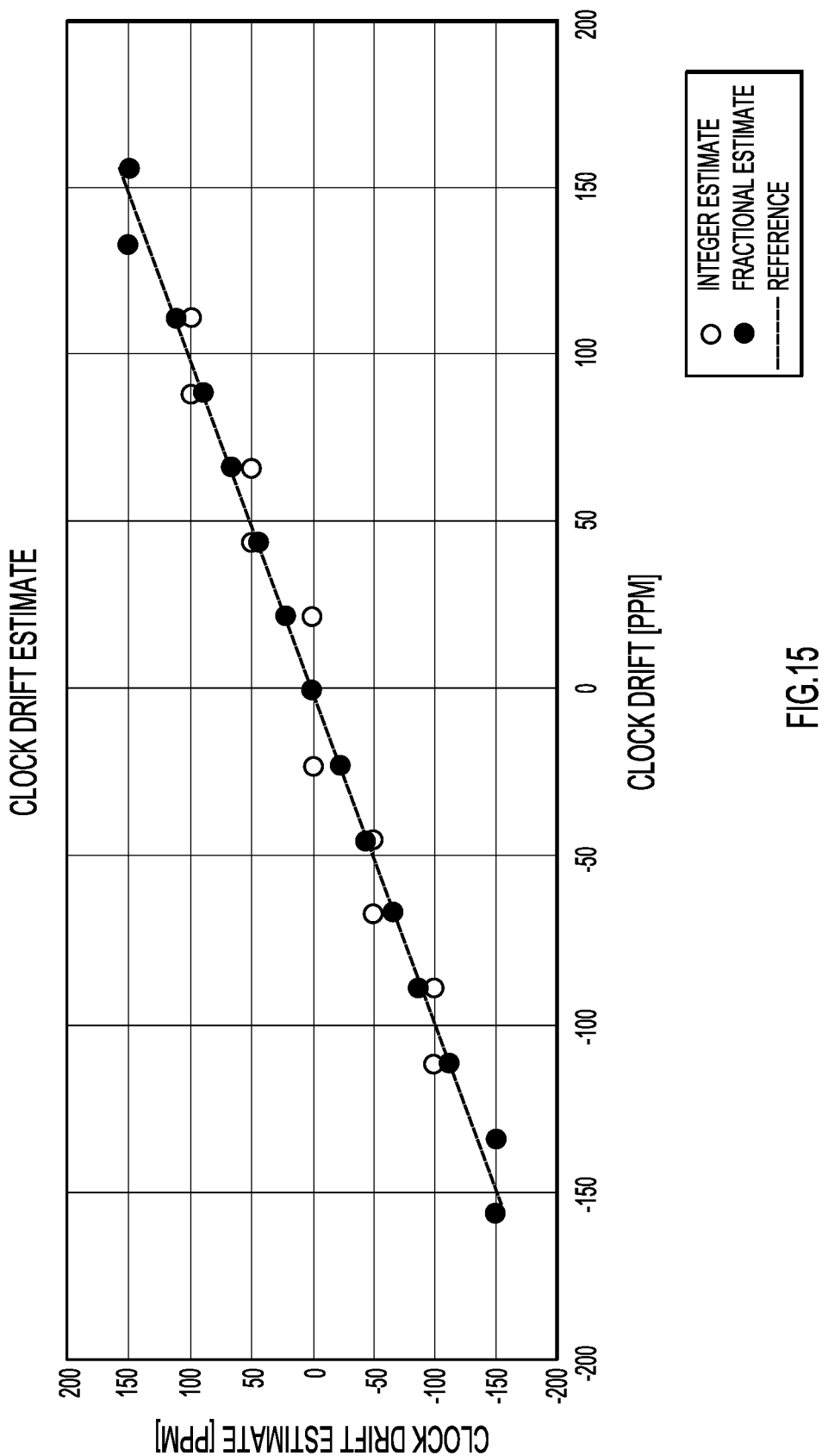
FIG. 15 is a plot of estimated clock drift from a simulated range of drifts resulting from a Doppler correlator bank, according to an example embodiment.

With reference to FIG. 15, there is a plot of estimated clock drift from a simulated range of drifts from −155 ppm to 155 ppm using an approximate N=256 Doppler correlator bank as described herein including 7 uniform bins from −150 ppm to +150 ppm, where phase rotation is only carried out in the final 2 butterflies. As indicated in the plot, the integer estimate (magnitude peak index) follows the reference clock offset quite closely, but the fractional results (using quadratic interpolation) is significantly more accurate, with the exception of the extreme bins [−150, 150] ppm, where no interpolation is carried out.

In summary, in one form, an apparatus is provided comprising: a Doppler correlator bank including Doppler correlators each configured to receive samples of a signal sampled based on a frequency, wherein: each Doppler correlator respectively includes successive butterfly elements, each butterfly element including cross-coupled first and second branches that include a sample delay that doubles for each successive butterfly element, and a sample inversion selectively placed in one of the first and second branches to encode into the successive butterfly elements of each Doppler correlator the same code sequence; each Doppler correlator is configured with a respective phase rotation that varies across the Doppler correlators; and each Doppler correlator is configured to correlate the samples against the code sequence and apply the respective phase rotation to the samples as the samples are shifted through the successive butterfly elements, to produce respective correlation results from each Doppler correlator centered on a respective frequency offset from the frequency that varies across the Doppler correlators based on the respective phase rotations.

In another form, a method is provided comprising: at a Doppler correlator bank including Doppler correlators each configured to receive samples of a signal sampled based on a frequency, each Doppler correlator respectively including successive butterfly elements, each butterfly element including cross-coupled first and second branches that include a sample delay that doubles for each successive butterfly element, and a sample inversion selectively placed in one of the first and second branches to encode into the successive butterfly elements of each Doppler correlator the same code sequence, each Doppler correlator configured with a respective phase rotation that varies across the Doppler correlators, by each Doppler correlator: correlating the samples against the code sequence and applying the respective phase rotation to the samples by shifting the samples through the successive butterfly elements, to produce respective correlation results from each Doppler correlator centered on a respective frequency offset from the frequency that varies across the Doppler correlators based on the respective phase rotations.

In yet another form, a non-transitory computer readable medium encoded with instructions is provided. The instructions, when executed by a processor, cause the processor to: implement a Doppler correlator bank including Doppler correlators each configured to receive samples of a signal sampled based on a frequency, wherein: each Doppler correlator respectively includes successive butterfly elements, each butterfly element including cross-coupled first and second branches that include a sample delay that doubles for each successive butterfly element, and a sample inversion selectively placed in one of the first and second branches to encode into the successive butterfly elements of each Doppler correlator the same code sequence; each Doppler correlator is configured with a respective phase rotation that varies across the Doppler correlators; and each Doppler correlator is configured to correlate the samples against the code sequence and apply the respective phase rotation to the samples as the samples are shifted through the successive butterfly elements, to produce respective correlation results from each Doppler correlator centered on a respective frequency offset from the frequency that varies across the Doppler correlators based on the respective phase rotations.

The above description is intended by way of example only. Various modifications and structural changes may be made therein without departing from the scope of the concepts described herein and within the scope and range of equivalents of the claims.

What is claimed is:

1. An apparatus comprising:
one or more first butterfly elements coupled between an input node and an intermediate node, the input node configured to receive samples of a signal sampled based on a frequency; and
sets of one or more second butterfly elements coupled in parallel with each other between the intermediate node and respective output nodes and configured with respective phase rotations that vary across the sets of one or more second butterfly elements,
wherein the one or more first butterfly elements are configured to perform sub-correlations on the samples to produce an intermediate correlation result, and the sets of one or more second butterfly elements are configured to perform respective correlations in parallel on, and apply the respective phase rotations to, the intermediate correlation result, to produce respective correlation results at the respective output nodes and centered on respective frequency offsets from the frequency that vary across the respective correlation results based on the respective phase rotations.

2. The apparatus of claim 1, wherein:
the one or more first butterfly elements are configured to perform the sub-correlations without applying phase rotation to the samples.

3. The apparatus of claim 1, wherein:
the one or more first butterfly elements and respective ones of the sets of one or more second butterfly elements collectively form respective Doppler correlators of a Doppler correlator bank, and each of the Doppler correlators is configured with a code sequence that is the same for each of the Doppler correlators, such that each of the Doppler correlators is configured to correlate the samples against the code sequence.

4. The apparatus of claim 3, wherein:
the one or more first butterfly elements each includes cross-coupled first and second branches that include a sample delay in one of the first and second branches, and a sample inversion selectively placed in one of the first and second branches to at least partially encode the code sequence into the one or more first butterfly elements.

5. The apparatus of claim 4, wherein:
at least some of the sets of one or more second butterfly elements each includes a respective phase rotator to apply a corresponding one of the respective phase rotations.

6. The apparatus of claim 3, wherein the code sequence includes a Prometheus Orthonormal Sets (PONS) code sequence.

7. The apparatus of claim 1, wherein:
the respective phase rotations include a zero phase rotation, one or more positive phase rotations, and one or more negative phase rotations; and
the respective frequency offsets include a zero frequency offset, one or more positive frequency offsets, and one or more negative frequency offsets corresponding to the zero phase rotation, the one or more positive phase rotations, and the one or more negative phase rotations, respectively.

8. A method comprising:
at a Doppler correlator bank including: one or more first butterfly elements coupled between an input node and an intermediate node, the input node configured to receive samples of a signal sampled based on a frequency; and sets of one or more second butterfly elements, the sets of one or more second butterfly elements coupled in parallel with each other between the intermediate node and respective output nodes and configured with respective phase rotations that vary across the sets of one or more second butterfly elements:
by the one or more first butterfly elements, performing sub-correlations on the samples to produce an intermediate correlation result; and
by the sets of one or more second butterfly elements, performing respective correlations in parallel on, and applying the respective phase rotations to, the intermediate correlation result, to produce respective correlation results at the respective output nodes and centered on respective frequency offsets from the frequency that vary across the respective correlation results based on the respective phase rotations.

9. The method of claim 8, further comprising:
by the one or more first butterfly elements, performing the sub-correlations without applying phase rotation to the samples.

10. The method of claim 8, wherein the one or more first butterfly elements and respective ones of the sets of one or more second butterfly elements collectively form Doppler correlators of the Doppler correlator bank, and each of the Doppler correlators is configured with a code sequence that is the same for each of the Doppler correlators, the method further comprising: by each of the Doppler correlators, correlating the samples against the code sequence.

11. The method of claim 10, wherein the one or more first butterfly elements each includes cross-coupled first and second branches that include a sample delay in one of the first and second branches, and a sample inversion selectively placed in one of the first and second branches to at least partially encode the code sequence into the one or more first butterfly elements.

12. The method of claim 11, wherein at least some of the sets of one or more second butterfly elements each includes a respective phase rotator, and the method further comprises: by the respective phase rotator, applying a corresponding one of the respective phase rotations.

13. The method of claim 10, wherein the code sequence includes a Prometheus Orthonormal Sets (PONS) code sequence.

14. The method of claim 8, wherein:
the respective phase rotations include a zero phase rotation, one or more positive phase rotations, and one or more negative phase rotations; and
the respective frequency offsets include a zero frequency offset, one or more positive frequency offsets, and one or more negative frequency offsets corresponding to the zero phase rotation, the one or more positive phase rotations, and the one or more negative phase rotations, respectively.

15. A non-transitory computer readable medium encoded with instruction that, when executed by a processor, cause the processor to perform operations associated with a Doppler correlator bank that includes: one or more first butterfly elements coupled between an input node and an intermediate node, the input node configured to receive samples of a signal sampled based on a frequency; and sets of one or more second butterfly elements, the sets of one or more second butterfly elements coupled in parallel with each other between the intermediate node and respective output nodes and configured with respective phase rotations that vary across the sets of one or more second butterfly elements, the operations including:
performing, by the one or more first butterfly elements, sub-correlations on the samples to produce an intermediate correlation result; and
performing, by the sets of one or more second butterfly elements, respective correlations in parallel on, and applying the respective phase rotations to, the intermediate correlation result, to produce respective correlation results at the respective output nodes and centered on respective frequency offsets from the frequency that vary across the respective correlation results based on the respective phase rotations.

16. The non-transitory computer readable medium of claim 15, wherein:
the sub-correlations are performed without applying phase rotation to the samples.

17. The non-transitory computer readable medium of claim 15, wherein:

the one or more first butterfly elements and respective ones of the sets of one or more second butterfly elements collectively form respective Doppler correlators of the Doppler correlator bank, and each of the Doppler correlators is configured with a code sequence that is the same for each of the Doppler correlators, such that each of the Doppler correlators is configured to correlate the samples against the code sequence.

18. The non-transitory computer readable medium of claim 17, wherein:

the one or more first butterfly elements each includes cross-coupled first and second branches that include a sample delay in one of the first and second branches, and a sample inversion selectively placed in one of the first and second branches to at least partially encode the code sequence into the one or more first butterfly elements.

19. The non-transitory computer readable medium of claim 17, wherein the code sequence includes a Prometheus Orthonormal Sets (PONS) code sequence.

20. The non-transitory computer readable medium of claim 15, wherein:

the respective phase rotations include a zero phase rotation, one or more positive phase rotations, and one or more negative phase rotations; and the respective frequency offsets include a zero frequency offset, one or more positive frequency offsets, and one or more negative frequency offsets corresponding to the zero phase rotation, the one or more positive phase rotations, and the one or more negative phase rotations, respectively.

* * * * *